(12) United States Patent
van der Mee et al.

(10) Patent No.: US 9,994,709 B2
(45) Date of Patent: Jun. 12, 2018

(54) THERMOPLASTIC COMPOSITIONS HAVING LOW SMOKE, METHODS OF THEIR MANUFACTURE, AND USES THEREOF

(71) Applicant: SABIC GLOBAL TECHNOLOGIES B.V., Bergen Op Zoom (NL)

(72) Inventors: Mark Adrianus Johannes van der Mee, Breda (NL); Robert Dirk van de Grampel, Tholen (NL); Roland Sebastian Assink, Middleburg (NL); Paul Dean Sybert, Evansville, IN (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 23 days.

(21) Appl. No.: 15/061,514

(22) Filed: Mar. 4, 2016

(65) Prior Publication Data

US 2016/0185960 A1    Jun. 30, 2016

Related U.S. Application Data

(62) Division of application No. 13/780,430, filed on Feb. 28, 2013, now abandoned.

(Continued)

(51) Int. Cl.

| C08L 69/00 | (2006.01) |
|---|---|
| C09K 21/14 | (2006.01) |
| B32B 5/00 | (2006.01) |
| C08L 83/10 | (2006.01) |
| B32B 27/36 | (2006.01) |
| C08L 79/04 | (2006.01) |
| C08K 5/49 | (2006.01) |

(Continued)

(52) U.S. Cl.
CPC .............. *C08L 69/005* (2013.01); *B32B 5/00* (2013.01); *B32B 27/365* (2013.01); *C08K 5/49* (2013.01); *C08L 69/00* (2013.01); *C08L 79/04* (2013.01); *C08L 83/10* (2013.01); *C09K 21/14* (2013.01); *C08G 73/1046* (2013.01); *C08G 77/448* (2013.01); *C08L 79/08* (2013.01); *C08L 2201/02* (2013.01)

(58) Field of Classification Search
CPC ........ C08L 69/00; C08L 69/005; C08L 79/04; C08L 79/08; C08L 2201/02; B32B 5/00; B32B 27/365; B32B 83/10; C09K 21/14; C08G 73/1046; C08G 77/448
See application file for complete search history.

(56) References Cited

U.S. PATENT DOCUMENTS 3,972,902 A    8/1976  Heath et al.
4,387,193 A    6/1983  Giles, Jr.

(Continued)

FOREIGN PATENT DOCUMENTS

CA    2157082 A1    5/1996
CN    1721404 A    1/2006
(Continued)

OTHER PUBLICATIONS

Bhandari et al., "Polyetherimide-Polyestercarbonate Blends With Low Heat Release", ANTEC 2008, pp. 1791-1794.
Gallucci et al., "New High Impact Miscible Polycarbonate Polyimide Blends", ANTEC conference proceedings, vol. 7, 2005, 6 pages.
Heat Release, Currenta GmbH & Co. OHG information sheet: "prCEN/TS 45545-2 (Feb. 2008)—Fire protection on railway vehicles: Heat Release", Feb. 2008, 3 pages.
International Search Report for International Application No. PCT/US2013/028325, International Application Filing Date: Feb. 28, 2013; dated Jun. 6, 2013; 5 pages.
Lateral Flame Spread, Currenta GmbH & Co. OHG information sheet: "CEN TS 45545-2 (Feb. 2008)—Fire protection on railway vehicles: Lateral Flame Spread", Feb. 2008, 2 pages.
(Continued)

*Primary Examiner* — Robert Jones, Jr.
(74) *Attorney, Agent, or Firm* — Cantor Colburn LLP

(57) ABSTRACT

A low smoke density thermoplastic composition comprising, based on the total weight of the thermoplastic composition, 70 to 95 wt % of a polycarbonate copolymer comprising first repeating units and second repeating units, wherein the first repeating units are not the same as the second repeating units, and wherein the first repeating units are bisphenol carbonate units of the formula wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and the second repeating units comprise bisphenol carbonate units that are not the same as the first repeating bisphenol carbonate units, siloxane units, arylate ester units, or a combination of arylate ester units and siloxane units; and 5 to 30 wt % of a polyetherimide based on the weight of the composition, wherein an article molded from the composition has a smoke density (Ds-4) value of equal to or less than 300 as measured by ISO 5659-2 on a 3 mm thick plaque.

22 Claims, 4 Drawing Sheets

Related U.S. Application Data

(60) Provisional application No. 61/604,861, filed on Feb. 29, 2012.

(51) Int. Cl.
*C08L 79/08* (2006.01)
*C08G 73/10* (2006.01)
*C08G 77/448* (2006.01)

(56) References Cited

U.S. PATENT DOCUMENTS

| | | | |
|---|---|---|---|
| 4,430,484 | A | 2/1984 | Quinn |
| 4,455,410 | A | 6/1984 | Giles, Jr. |
| 4,548,997 | A | 10/1985 | Mellinger et al. |
| 4,710,548 | A | 12/1987 | Byrne |
| 5,387,639 | A | 2/1995 | Sybert et al. |
| 6,072,011 | A | 6/2000 | Hoover |
| 6,204,313 | B1 | 3/2001 | Bastiaens et al. |
| 7,767,738 | B2 | 8/2010 | Gaggar et al. |
| 7,790,292 | B2 | 9/2010 | Colborn et al. |
| 2004/0220330 | A1 | 11/2004 | Derudder et al. |
| 2005/0159577 | A1 | 7/2005 | Davis et al. |
| 2006/0125143 | A1 | 6/2006 | Donea et al. |
| 2007/0049706 | A1 | 3/2007 | Siripurapu et al. |
| 2007/0066737 | A1 | 3/2007 | Gallucci et al. |
| 2007/0129492 | A1 | 6/2007 | Colborn et al. |
| 2008/0004404 | A1 | 1/2008 | Van De Grampel et al. |
| 2009/0306258 | A1 | 12/2009 | Siripurapu et al. |
| 2009/0318629 | A1 | 12/2009 | Adoni et al. |
| 2011/0060106 | A1 | 3/2011 | De Kraker et al. |
| 2011/0229704 | A1 | 9/2011 | Grcev et al. |

FOREIGN PATENT DOCUMENTS

| | | |
|---|---|---|
| CN | 101233192 A | 7/2008 |
| CN | 100551948 C | 10/2009 |
| DE | 3844183 A1 | 6/1990 |
| EP | 0645422 A1 | 3/1995 |
| JP | 09183893 | 7/1997 |
| JP | 10007897 | 1/1998 |
| WO | 9410245 A1 | 5/1994 |
| WO | 2010067231 A1 | 6/2010 |

OTHER PUBLICATIONS

Lin et al., "Polymers with Improved Flammability chracteristics. I.Phenolphthalein-Related Homopolymers", Journal of Polymer Science: Polymer Chemistry Edition, Vo. 19, pp. 2659-2670, 1981, XP009050158.
Schartel, B. "Phosphorus-based Flame Retardency Mechanisms—Old Hat or a Starting Point for Future Development?", Materials, 2010, vol. 3, pp. 4710-4745.
Smoke Optical Density and Toxicity, Currenta GmbH & Co. OHG information sheet: "prCEN/TS 45545-2 (Feb. 2008)—Fire protection on railway vehicles: Smoke optical desnity and toxicity", Feb. 2008, 4 pages.
U.S. Appl. No. 13/724,780, filed with the USPTO Dec. 12, 2012.
U.S. Appl. No. 13/780,355, filed with the USPTO Feb. 28, 2013.
U.S. Appl. No. 13/874,700, filed with the USPTO May 1, 2013.
U.S. Appl. No. 13/874,746, filed with the USPTO May 1, 2013.
U.S. Appl. No. 13/874,896, filed with the USPTO May 1, 2013.
Van Der Mee et al., U.S. Appl. No. 13/915,710, "Interior Aircraft Components and Methods of Manufacture", Filed with the USPTO Jun. 12, 2013.
Written Opinion for International Application No. PCT/US2013/028325, International Application Filing Date: Feb. 28, 2013; dated Jun. 6, 2013; 7 pages.

THERMOPLASTIC COMPOSITIONS HAVING LOW SMOKE, METHODS OF THEIR MANUFACTURE, AND USES THEREOF

CROSS REFERENCE TO RELATED APPLICATION

This application is a division of U.S. application Ser. No. 13/780,430 filed Feb. 28, 2013, which claims the benefit of U.S. Patent Application No. 61/604,861, filed Feb. 29, 2012, all of the foregoing being incorporated by reference in its their entirety herein.

BACKGROUND

This disclosure is directed to flame retardant thermoplastic compositions having unexpectedly low smoke density, their methods of manufacture, and methods of use thereof. The compositions are especially useful in the manufacture of components for mass transportation applications, such as rail.

Polycarbonates are useful in a wide variety of applications at least in part because of their good balance of properties, such as moldability, heat resistance and impact properties among others. However, standards for flame retardancy properties such as flame spread, heat release, and smoke generation upon burning have become increasingly stringent, particularly in applications used in mass transportation (aircraft, trains, and ships), as well as building and construction. For example, the European Union has approved the introduction of a new harmonized fire standard for rail applications, namely EN-45545, to replace all currently active different standards in each member state. This norm will impose stringent requirements on smoke density and heat release properties allowed for materials used in these applications. Smoke density (Ds-4) in EN-45545 is the smoke density after 4 minutes determined in accordance with ISO 5659-2, and heat release in EN-45545 is the maximum average rate of heat emission (MAHRE) determined in accordance with ISO 5660-1.

It is exceptionally challenging to develop materials that meet stringent smoke density standards in addition to other material requirements. It is particularly challenging to develop materials that meet these requirements and that have good mechanical properties (especially impact/scratch resistance) and processability. Accordingly there remains a need in the art for thermoplastic compositions that have excellent low smoke properties. It would be a further advantage if the compositions could be rendered low smoke without a significant properties detrimental effect on one or more of material cost, processability, and mechanical properties. It would be a still further advantage if the materials could be readily thermoformed or injection molded.

SUMMARY

A thermoplastic composition comprises, based on the total weight of the thermoplastic composition, 70 to 95 wt % of a polycarbonate copolymer comprising first repeating units and second repeating units, wherein the first repeating units are not the same as the second repeating units, and wherein the first repeating units are bisphenol carbonate units of the formula

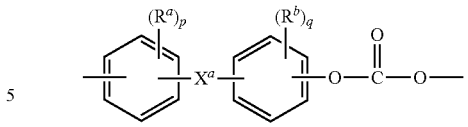

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and the second repeating units comprise bisphenol carbonate units that are not the same as the first repeating bisphenol carbonate units, siloxane units, arylate ester units, or a combination of arylate ester units and siloxane units; and 5 to 30 wt % of a polyetherimide based on the weight of the composition, wherein an article molded from the composition has a smoke density value of equal to or less than 300 as measured by ISO 5659-2 on a 3 mm thick plaque.

In another embodiment, the thermoplastic composition has a multiaxial impact energy, as measured according to ISO 6603 on a 3.2 mm thick disc within 20% of the same composition without the polyetherimide.

A method of manufacture of the thermoplastic compositions comprises extruding or melt blending the components of the thermoplastic compositions to form the thermoplastic compositions.

In yet another embodiment, an article comprises the thermoplastic compositions. The article can be a component of a mass transportation vehicle, in particular a rail, aircraft, or marine vehicle.

In still another embodiment, a method of manufacture of an article comprises molding, extruding, or shaping the above-described thermoplastic composition to form the article.

The above described and other features are exemplified by the following detailed description and figures.

BRIEF DESCRIPTION OF THE DRAWINGS

A description of the figures, which are meant to be exemplary and not limiting, is provided in which.

Figure 1:
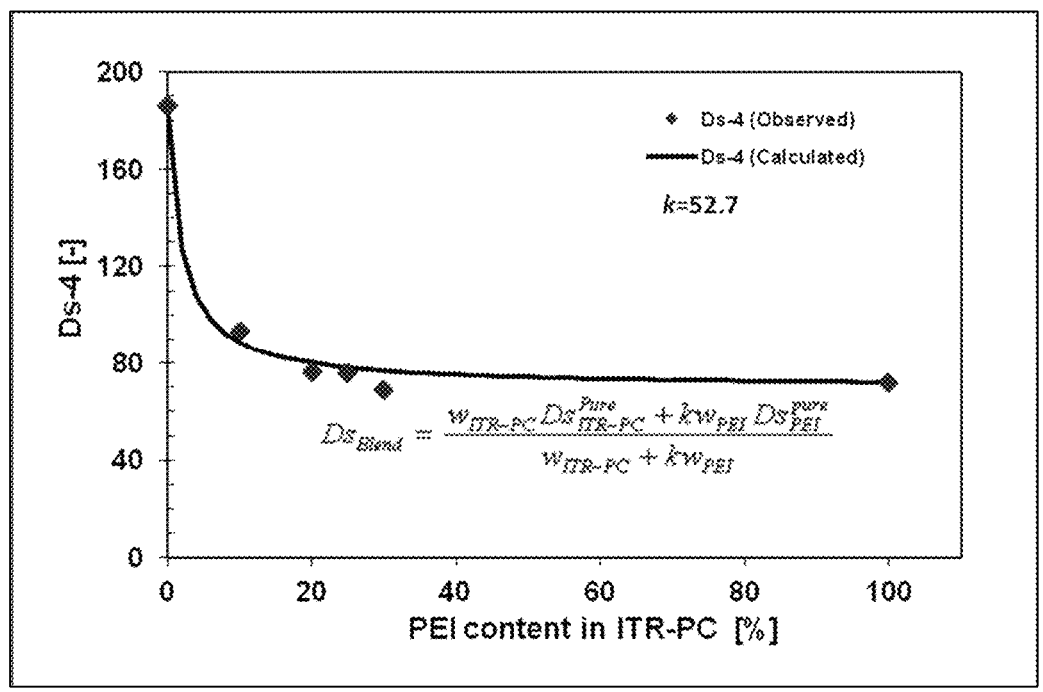
FIG. 1 shows the effect of an increase in fractional concentration (wt %) of a polyetherimide in an ITR-PC copolymer on smoke density (Ds-4), indicating an interaction behavior.

The above described and other features are exemplified by the following detailed description and Examples.

DETAILED DESCRIPTION

The inventors hereof have discovered that thermoplastic compositions having very low smoke density as well as low heat release can unexpectedly be obtained by combining certain polycarbonate copolymers with a small amount of a polyetherimide. In particular, the inventors have discovered that the combination of the small amount of polyetherimide to certain polycarbonate copolymers results in a non-linear decrease in the smoke density (Ds-4) of the copolymers as determined in accordance with ISO 5659-2, in addition to decreasing the heat release (MAHRE) as determined in accordance with ISO 5660-1. The results are particularly surprising because only relatively small amounts of polyetherimides are used, but the resulting smoke densities can be as low as those obtained from polyetherimide alone. For example, the thermoplastic composition can have a smoke density (Ds-4) of less than 300 as determined in accordance with ISO 5659-2, despite the much higher Ds-4 of the composition without polyetherimide. The thermoplastic compositions can further have a heat release (MAHRE) of less than 90 as determined in accordance with ISO 5660-1. With this discovery, it is now possible to manufacture flame retardant compositions having one or more of good impact properties, low color, and high flow of polycarbonates, with the very low smoke densities (Ds-4) determined according to ISO5659-2 on 3 mm thick samples and low heat release (MAHRE) determined according to ISO 5660-1 on 3 mm thick samples, properties of polyetherimides.

Thus, the thermoplastic compositions can further have excellent impact strength. The thermoplastic compositions can also be formulated to have low melt viscosities, which renders them suitable for injection molding. The compositions can further have very low color, and in particular white compositions can be obtained. Such compositions are especially useful in the manufacture of large, low smoke, low heat release polycarbonate sheets that can be used, for example, in the manufacture of components in aircraft, train, marine, or other mass transportation applications, as well as components in high occupancy, low supervision structures.

In particular, the thermoplastic compositions contain a polycarbonate copolymer comprising first carbonate units and second units that are different from the first carbonate units. The first carbonate units are bisphenol carbonate units derived from a bisphenol-type compound. The second units can be bisphenol carbonate units different from the first units, siloxane units, arylate ester units, or a combination comprising at least one of the foregoing types of units. For example, a combination of first bisphenol carbonate units, arylate ester units, and siloxane units can be present as the second units. The thermoplastic compositions further contain 10 to 30 wt % of a polyetherimide, present in an amount effective to provide a smoke density (Ds-4) of less than 300 as determined in accordance with ISO 5659-2 on 3 mm thick plaques.

As used herein, the term "polycarbonate" and "polycarbonate copolymer" refers to compounds having first repeating first units that are bisphenol carbonate units of formula (1)

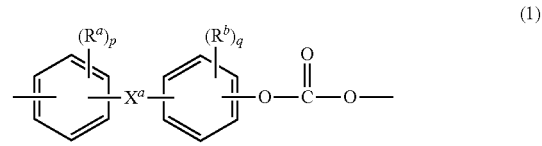

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. Exemplary $X^a$ groups include methylene, ethylidene, neopentylidene, and isopropylidene. The bridging group $X^a$ and the carbonate oxygen atoms of each $C_6$ arylene group can be disposed ortho, meta, or para (specifically para) to each other on the $C_6$ arylene group.

In a specific embodiment, $R^a$ and $R^b$ are each independently a $C_{1-3}$ alkyl group, p and q are each independently 0 to 1, and $X^a$ is a single bond, —O—, —S(O)—, —S(O)$_2$—, —C(O)—, a $C_{1-9}$ alkylidene of formula —C($R^c$)($R^d$)— wherein $R^c$ and $R^d$ are each independently hydrogen or $C_{1-8}$ alkyl, or a group of the formula —C(=$R^e$)— wherein $R^e$ is a divalent $C_{1-9}$ hydrocarbon group. In another specific embodiment, $R^a$ and $R^b$ are each independently a methyl group, p and q are each independently 0 to 1, and $X^a$ is a single bond, a $C_{1-7}$ alkylidene of formula —C($R^c$)($R^d$)— wherein $R^c$ and $R^d$ are each independently hydrogen or $C_{1-6}$ alkyl. In an embodiment, p and q is each 1, and $R^a$ and $R^b$ are each a $C_{1-3}$ alkyl group, specifically methyl, disposed meta to the oxygen on each ring. The bisphenol carbonate units (1) can be derived from bisphenol-A, where p and q are both 0 and $X^a$ is isopropylidene.

The polycarbonate units in the copolymers can be produced from dihydroxy compounds of the formula (2)

wherein $R^1$ is a bridging moiety. Thus, the bisphenol carbonate units (1) are generally produced from the corresponding bisphenol compounds of formula (3)

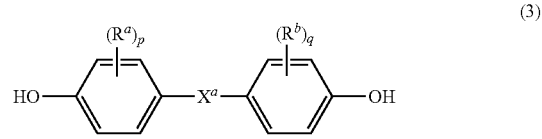

wherein $R^a$ and $R^b$, p and q, and $X^a$ are the same as in formula (1).

Some illustrative examples of specific bisphenol compounds that can be used to produce units (1) include 4,4'-dihydroxybiphenyl, bis(4-hydroxyphenyl)methane, 1,2-bis (4-hydroxyphenyl)ethane, 2-(4-hydroxyphenyl)-2-(3-hydroxyphenyl)propane, 1,2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2- bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, bis(4-hydroxyphenyl)ether, bis(4-hydroxyphenyl)sulfide, bis(4-hydroxyphenyl)sulfoxide, bis(4-hydroxyphenyl)sulfone, or a combination comprising at least one of the foregoing bisphenolic compounds.

Specific examples of bisphenol compounds that can be used in the production of bisphenol carbonate units (1) include 1,1-bis(4-hydroxyphenyl)methane, 1,1-bis(4-hydroxyphenyl)ethane, 2,2-bis(4-hydroxyphenyl)propane ("bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-2-methylphenyl)propane, 1,1-bis(4-hydroxy-t-butylphenyl)propane, and combinations comprising at least one of the foregoing bisphenol compounds.

As stated above, the polycarbonate copolymer further comprises second repeating units. The second repeating units can be bisphenol carbonate units (provided that they are different from the bisphenol carbonate units (1)), arylate ester units, siloxane units, or a combination of arylate ester units and siloxane units. In particular, the second units can be bisphenol carbonate units of formula (4)

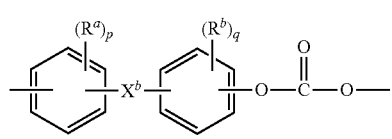

(4)

wherein $R^a$ and $R^b$ are each independently $C_{1-12}$ alkenyl, $C_{3-8}$ cycloalkyl, or $C_{1-12}$ alkoxy, p and q are each independently integers of 0 to 4, and $X^b$ is $C_{2-32}$ bridging hydrocarbon group that is not the same as the $X^a$ in the polycarbonate copolymer. The bridging group $X^b$ and the carbonate oxygen atoms of each $C_6$ arylene group can be disposed ortho, meta, or para (specifically para) to each other on the $C_6$ arylene group.

In an embodiment, $X^b$ is a substituted or unsubstituted $C_{3-18}$ cycloalkylidene, a substituted or unsubstituted $C_{3-18}$ cycloalkylene, a substituted or unsubstituted $C_{12-25}$ alkylidene of formula —$C(R^c)(R^d)$— wherein $R^c$ and $R^d$ are each independently hydrogen, $C_{1-24}$ alkyl, $C_{4-12}$ cycloalkyl, $C_{6-12}$ aryl, $C_{7-12}$ arylalkylene, $C_{1-12}$ heteroalkyl, or cyclic $C_{7-12}$ heteroarylalkyl, or a group of the formula —$C(=R^e)$— wherein $R^e$ is a divalent $C_{12-31}$ hydrocarbon group. Exemplary $X^b$ groups include cyclohexylmethylidene, 1,1-ethene, 2-[2.2.1]-bicycloheptylidene, cyclohexylidene, cyclopentylidene, cyclododecylidene, and adamantylidene.

In an embodiment, $X^b$ is a substituted or unsubstituted $C_{5-32}$ alkylidene of formula —$C(R^c)(R^d)$— wherein $R^c$ and $R^d$ are each independently hydrogen, $C_{4-12}$ cycloalkyl, $C_{6-12}$ aryl, $C_{7-12}$ arylalkylene, $C_{1-12}$ heteroalkyl, a substituted or unsubstituted group of the formula —$C(=R^e)$— wherein $R^e$ is a divalent $C_{12-31}$ hydrocarbyl, a substituted or unsubstituted $C_{5-18}$ cycloalkylidene, a substituted or unsubstituted $C_{5-18}$ cycloalkylene, a substituted or unsubstituted $C_{3-18}$ heterocycloalkylidene, or a group of the formula —$B^1$-G-$B^2$— wherein $B^1$ and $B^2$ are the same or different $C_{1-6}$ alkylene group and G is a $C_{3-12}$ cycloalkylidene group or a $C_{6-16}$ arylene group.

For example, $X^b$ can be a substituted $C_{3-18}$ heterocycloalkylidene of formula (4a)

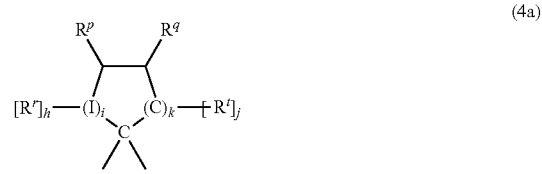

(4a)

wherein $R^r$, $R^p$, $R^q$, and $R^t$ are each independently hydrogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (3) will have an unsaturated carbon-carbon linkage where the ring is fused. When k is one and i is 0, the ring as shown in formula (6) contains 4 carbon atoms, when k is 2, the ring contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Specific second bisphenol carbonate repeating units of this type are phthalimidine carbonate units of formula (4b)

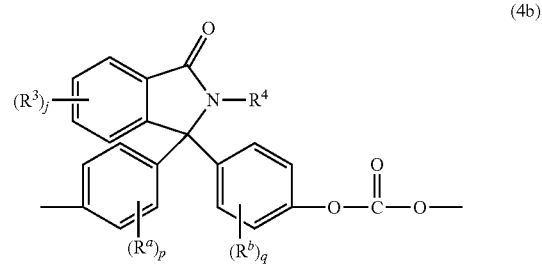

(4b)

wherein $R^a$, $R^b$, p, and q are as in formula (4), $R^3$ is each independently a $C_{1-6}$ alkyl group, j is 0 to 4, and $R^4$ is hydrogen, $C_{1-6}$ alkyl, phenyl optionally substituted with 1 to 5 $C_{1-6}$ alkyl groups. In particular, the phthalimidine carbonate units are of formula (4c)

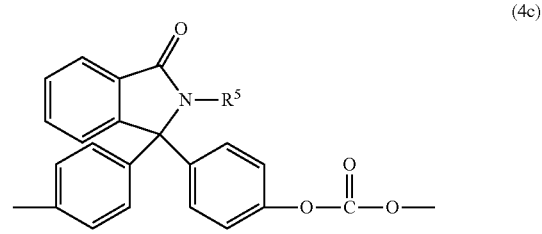

(4c)

wherein $R^5$ is hydrogen, phenyl optionally substituted with 1 to 5 $C_{1-6}$ alkyl groups, or $C_{1-6}$ alkyl. In an embodiment, $R^5$ is hydrogen, phenyl or methyl. Carbonate units (4a) wherein $R^5$ is phenyl can be derived from 2-phenyl-3,3'-bis(4-hydroxy phenyl)phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units of this type are the isatin carbonate units of formula (4d) and (4e)

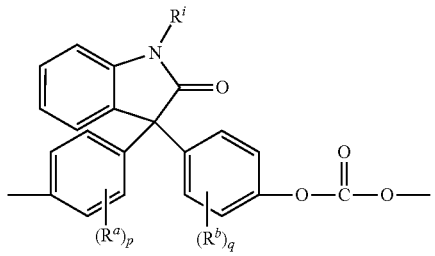
(4d)

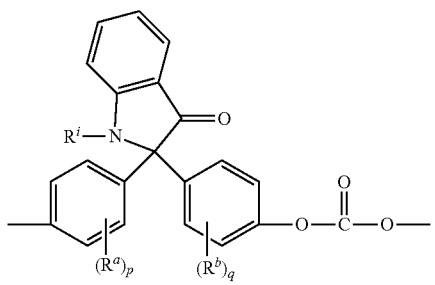
(4e)

wherein $R^a$ and $R^b$ are each independently $C_{1-12}$ alkyl, p and q are each independently 0 to 4, and $R^i$ is $C_{1-12}$ alkyl, phenyl, optionally substituted with 1 5 to $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^i$ is $C_{1-4}$ alkyl or phenyl.

Examples of bisphenol carbonate units (4) wherein $X^b$ is a substituted or unsubstituted $C_{3-18}$ cycloalkylidene include the cyclohexylidene-bridged, alkyl-substituted bisphenol of formula (4f)

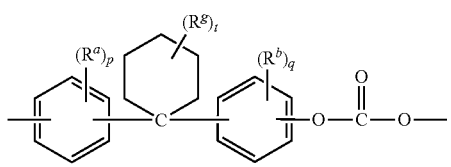
(4f)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, r and s are each 0 or 1, and t is 0 or 3, specifically 0.

Examples of other bisphenol carbonate units (4) wherein $X^b$ is a substituted or unsubstituted $C_{3-18}$ cycloalkylidene include adamantyl units (4g) and units (4h)

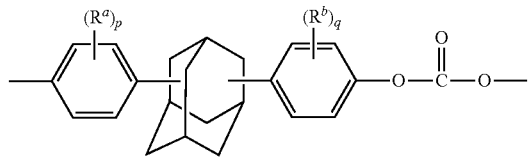
(4g)

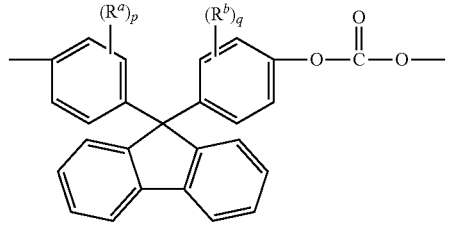
(4h)

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1. In another specific embodiment, $R^a$, $R^b$ are each methyl, p and q are each 0 or 1. Carbonates containing units (4b) to (4h) are useful for making polycarbonates with high glass transition temperatures (Tg) and high heat distortion temperatures.

Bisphenol carbonate units (4) are generally produced from the corresponding bisphenol compounds of formula (5)

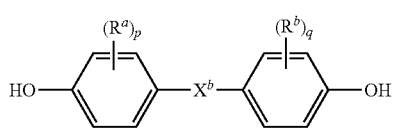
(5)

wherein $R^a$, $R^b$, p, q, and $X^b$ are the same as in formula (4).

Specific examples of bisphenol compounds of formula (5) include bis(4-hydroxyphenyl)diphenylmethane, 1,1-bis(4-hydroxy-t-butylphenyl)propane, 1,6-dihydroxynaphthalene, 2,6-dihydroxynaphthalene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathiin, 2,7-dihydroxy-9,10-dimethylphenazine, 3,6-dihydroxydibenzofuran, 3,6-dihydroxydibenzothiophene, 2,7-dihydroxycarbazole, and 2,6-dihydroxythianthrene 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used.

The relative mole ratio of first bisphenol carbonate units (1) and second bisphenol carbonate units (4) can vary from 99:1 to 1:99, depending on the desired characteristics of the thermoplastic composition, including glass transition temperature ("Tg"), impact strength, ductility, flow, and like considerations. For example, the mole ratio of units (1):units (4) can be from 90:10 to 10:90, from 80:20 to 20:80, from 70:30 to 30:70, or from 60:40 to 40:60. When bisphenol carbonate units (1) units are derived from bisphenol-A, the bisphenol-A units are generally present in an amount from 50 to 99 mole %, based on the total moles of units in the polycarbonate copolymer. For example, when bisphenol carbonate units (1) units are derived from bisphenol-A, and bisphenol units (4) are derived from PPPBP, the mole ration of units (1) to units (4) can be from 99:1 to 50:50, or from 90:10 to 55:45.

Other carbonate units can be present in any of the polycarbonate copolymers described herein, in relatively small amounts, for example less than 20 mole %, less than 10 mole %, or less than 5 mole %, based on the total moles of units in the polycarbonate copolymer. The other carbonate units can be derived from aliphatic or aromatic dihydroxy compounds having 1 to 32 carbon atoms, for example 1,6-dihydroxynaphthalene, 2,6-dihydroxynaphthalene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, and 2,6-dihydroxythianthrene. A specific aromatic dihydroxy compound includes the monoaryl dihydroxy compounds of formula (6)

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine. In an embodiment, no halogens are present. Specific monoaryl dihydroxy compounds (6) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, and the like; catechol; hydroquinone; and substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone. A combination comprising at least one of the foregoing aromatic dihydroxy compounds can be used. In an embodiment, the polycarbonate copolymer comprises carbonate units of formulas (1) and (4), and less than 10 mole % of units derived from monoaryl dihydroxy compounds (6), i.e., monoaryl carbonate units of the formula (6a)

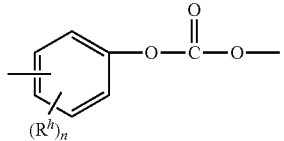

(6a)

wherein each $R^h$ is independently a halogen or $C_{1-10}$ hydrocarbon group, and n is 0 to 4. Specifically, each $R^h$ is independently a $C_{1-3}$ alkyl group, and n is 0 to 1, or n is 0. In another embodiment, no carbonate units other than units of formulas (1) and (4) are present in the polycarbonate copolymer.

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The water immiscible solvent can be, for example, methylene chloride, 1,2-dichloroethane, chlorobenzene, toluene, and the like.

Exemplary carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction.

Among tertiary amines that can be used are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X^-$, wherein each $R_3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include $(CH_3(CH_2)_3)_4N^+X^-$, $(CH_3(CH_2)_3)_4P^+X^-$, $(CH_3(CH_2)_5)_4N^+X^-$, $(CH_3(CH_2)_6)_4N^+X^-$, $(CH_3(CH_2)_4)_4N^+X^-$, $CH_3(CH_3(CH_2)_3)_3N^+X^-$, and $CH_3(CH_3(CH_2)_2)_3N^+X^-$, wherein X is $Cl^-$, $Br^-$, a $C_{1-8}$ alkoxy group or a $C_{6-18}$ aryloxy group. An effective amount of a phase transfer catalyst can be 0.1 to 10 wt %, or 0.5 to 2 wt %, each based on the weight of bisphenol in the phosgenation mixture.

Alternatively, melt processes can be used to make the polycarbonates. Melt polymerization may be conducted as a batch process or as a continuous process. In either case, the melt polymerization conditions used may comprise two or more distinct reaction stages, for example, a first reaction stage in which the starting dihydroxy aromatic compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of about 1,000 to about 7,500 Daltons. In one or more subsequent polymerization stages the number average molecular weight (Mn) of the polycarbonate is increased to between about 8,000 and about 25,000 Daltons (using polycarbonate standard).

The term "melt polymerization conditions" is understood to mean those conditions necessary to effect reaction between a dihydroxy aromatic compound and a diaryl carbonate in the presence of a transesterification catalyst. Typically, solvents are not used in the process, and the reactants dihydroxy aromatic compound and the diaryl carbonate are in a molten state. The reaction temperature can be about 100° C. to about 350° C., specifically about 180° C. to about 310° C. The pressure may be at atmospheric pressure, supra-atmospheric pressure, or a range of pressures from atmospheric pressure to about 15 torr in the initial stages of the reaction, and at a reduced pressure at later stages, for example about 0.2 to about 15 torr. The reaction time is generally about 0.1 hours to about 10 hours.

The diaryl carbonate ester can be diphenyl carbonate, or an activated diphenyl carbonate having electron-withdrawing substituents on the aryl groups, such as bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing.

Catalysts used in the melt polymerization of polycarbonates can include alpha or beta catalysts. Beta catalysts are typically volatile and degrade at elevated temperatures. Beta catalysts are therefore preferred for use at early low-temperature polymerization stages. Alpha catalysts are typically more thermally stable and less volatile than beta catalysts.

The alpha catalyst can comprise a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of a non-volatile inorganic acid such as $NaH_2PO_3$, $NaH_2PO_4$, $Na_2HPO_3$, $KH_2PO_4$, $CsH_2PO_4$, $Cs_2HPO_4$, and the like, or mixed salts of phosphoric acid, such as $NaKHPO_4$, $CsNaHPO_4$, $CsKHPO_4$, and the like. Combinations comprising at least one of any of the foregoing catalysts can be used.

Possible beta catalysts can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used. The quaternary phosphonium compound can be a compound of the structure $(R^5)_4P^+X^-$, wherein each $R^5$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents $2(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used.

The amount of alpha and beta catalyst used can be based upon the total number of moles of dihydroxy compound used in the polymerization reaction. When referring to the ratio of beta catalyst, for example a phosphonium salt, to all dihydroxy compounds used in the polymerization reaction, it is convenient to refer to moles of phosphonium salt per mole of the dihydroxy compound, meaning the number of moles of phosphonium salt divided by the sum of the moles of each individual dihydroxy compound present in the reaction mixture. The alpha catalyst can be used in an amount sufficient to provide $1 \times 10^{-2}$ to $1 \times 10^{-8}$ moles, specifically, $1 \times 10^{-4}$ to $1 \times 10^{-7}$ moles of metal per mole of the dihydroxy compounds used. The amount of beta catalyst (e.g., organic ammonium or phosphonium salts) can be $1 \times 10^{-2}$ to $1 \times 10^{-5}$, specifically $1 \times 10^{-3}$ to $1 \times 10^{-4}$ moles per total mole of the dihydroxy compounds in the reaction mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of about 0.05 to about 5 wt %. Combinations comprising linear polycarbonates and branched polycarbonates can be used.

All types of polycarbonate end groups are contemplated as being useful in the polycarbonate composition, provided that such end groups do not significantly adversely affect desired properties of the compositions. A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

The polycarbonate copolymers comprising carbonate units (1) and carbonate units (4) can have an intrinsic viscosity, as determined in chloroform at 25° C., of about 0.3 to about 1.5 deciliters per gram (dl/gm), specifically about 0.45 to about 1.0 dl/gm. The polycarbonate copolymers can have a weight average molecular weight of about 10,000 to about 200,000 g/mol, specifically about 20,000 to about 100,000 g/mol, as measured by gel permeation chromatography (GPC), using a crosslinked styrene-divinylbenzene column and calibrated to polycarbonate references. GPC samples are prepared at a concentration of about 1 mg per ml, and are eluted at a flow rate of about 1.5 ml per minute.

In another embodiment the polycarbonate copolymers contain the first repeating bisphenol carbonate units (1), and repeating arylate ester units of formula (7)

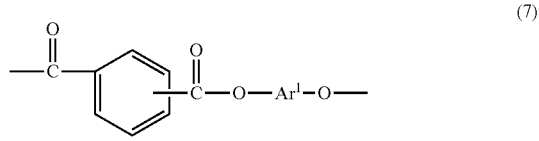

(7)

wherein $Ar^1$ is a $C_{6-32}$ hydrocarbyl group containing at least one aromatic group, e.g., a phenyl, naphthalene, anthracene, or the like. In an embodiment, $Ar^1$ is derived from an aromatic bisphenol as described above in connection with units (1) and (4), a monoaryl dihydroxy compound (6), or a combination comprising different bisphenol or monoaryl dihydroxy compounds. Thus, arylate ester units (7) can be derived by reaction of isophthalic acid, terephthalic acid, or a combination thereof (referred to herein as a "phthalic acid"), with any of the aromatic bisphenols described above, a monoaryl dihydroxy compound (6), or a combination thereof. The molar ratio of isophthalate to terephthalate can be 1:99 to 99:1, or 80:20 to 20:80, or 60:40 to 40:60.

The polycarbonate copolymers comprising first bisphenol carbonate units (1) and arylate ester units (7) can be alternating or block copolymers of formula (8)

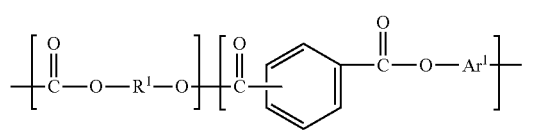

(8)

wherein $R^1$ and $Ar^1$ are as defined in formulas (1) and (7), respectively.

In general, the copolymers are block copolymers containing carbonate blocks and ester blocks. The weight ratio of total ester units to total carbonate units in the copolymers can vary broadly, for example from 99:1 to 1:99, or from 95:5 to 5:95, specifically from 90:10 to 10:90, or more specifically from 90:10 to 50:50, depending on the desired properties of the thermoplastic composition. The molar ratio of isophthalate to terephthalate in the ester units of the copolymers can also vary broadly, for example from 0:100 to 100:0, or from 92:8 to 8:92, more specifically from 98:2 to 45:55, depending on the desired properties of the thermoplastic composition. For example, the weight ratio of total ester units to total carbonate can be 99:1 to 40:60, or 90:10 to 50:40, wherein the molar ratio of isophthalate to terephthalate is from 99:1 to 40:50, more specifically 98:2 to 45:55, depending on the desired properties of the thermoplastic composition.

Additional carbonate units derived from the dihydroxy compound used to form the arylate ester units (7) can also be present as described above, for example in amounts of less than 20 mole %, less than 10 mole %, or less than 5 mole %, based on the total moles of units in the polycarbonate copolymer. It is also possible to have additional arylate ester units present derived from reaction of the phthalic acid with the dihydroxy compound used to form the carbonate units, for example in amounts of less than 20 mole %, less than 10 mole %, less than 5 mole %, or less than 1 mole % based on the total moles of units in the copolymer. In an embodiment, the combination of such additional carbonate units and such additional arylate ester units are present in an amount of less than 20 mole %, less than 10 mole %, less than 5 mole %, or less than 1 mole % based on the total moles of units in the copolymer.

A specific poly(carbonate-arylate ester) is a poly(carbonate)-co-(bisphenol arylate ester) comprising carbonate units (1), specifically bisphenol carbonate units, even more specifically bisphenol-A carbonate units and repeating bisphenol arylate ester units. Bisphenol arylate units comprise residues of phthalic acid and a bisphenol, for example a bisphenol (2). In an embodiment the bisphenol arylate ester units are of formula (7a)

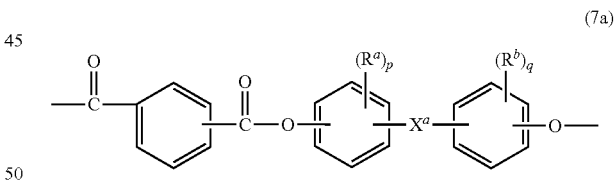

(7a)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. In an embodiment, p and q are each 1, and $R^a$ and $R^b$ are each a $C_{1-3}$ alkyl group, specifically methyl, disposed meta to the oxygen on each ring. The bisphenol can be bisphenol-A, where p and q are both 0 and $X^a$ is isopropylidene.

In a specific embodiment, the polycarbonate copolymer is a poly(bisphenol-A-phthalate-ester)-co-(bisphenol-A carbonate) of formula (8a)

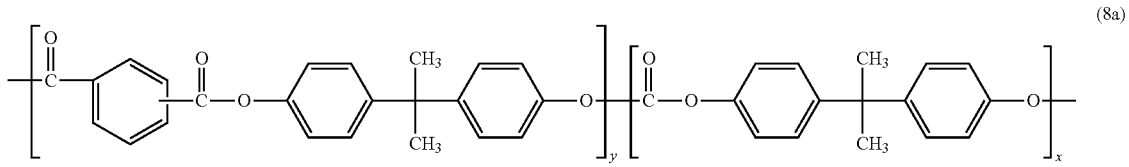

wherein x and y represent the weight percent of arylate-bisphenol-A ester units and bisphenol-A carbonate units, respectively. Generally, the units are present as blocks. In an embodiment, the weight percent of ester units y to carbonate units y in the copolymers is 50:50 to 99:1, or 55:45 to 90:10, or 75:25 to 95:5. Copolymers of formula (8a) comprising 35 to 45 wt % of carbonate units and 55 to 65 wt % of ester units, wherein the ester units have a molar ratio of isophthalate to terephthalate of 45:55 to 55:45 are often referred to as poly(carbonate-ester)s (PCE) and copolymers comprising 15 to 25 wt % of carbonate units and 75 to 85 wt % of ester units having a molar ratio of isophthalate to terephthalate from 98:2 to 88:12 are often referred to as poly(phthalate-carbonate)s (PPC).

In another embodiment, a specific polycarbonate copolymer contains carbonate units (1) and repeating monoaryl-arylate ester units of formula (7b)

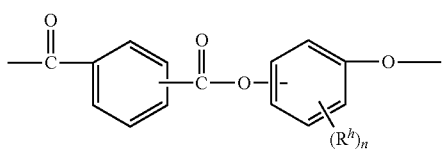

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Specifically, each $R^h$ is independently a $C_{1-4}$ alkyl, and n is 0 to 3, 0 to 1, or 0. These poly(carbonate)-co-(monoaryl arylate ester) copolymers are of formula (8b)

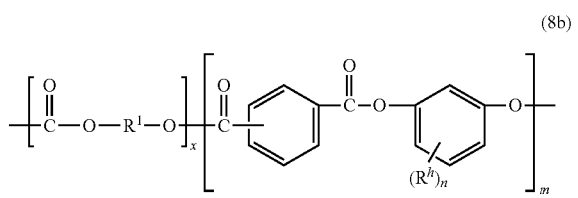

wherein $R^1$ is as defined in formula (1) and $R^h$, and n are as defined in formula (7b), and the mole ratio of x:m is 99:1 to 1:99, specifically 80:20 to 20:80, or 60:40 to 40:60.

Specifically, the monoaryl-arylate ester unit (7b) is derived from the reaction of a combination of isophthalic and terephthalic diacids (or derivatives thereof) with resorcinol (or reactive derivatives thereof) to provide isophthalate-terephthalate-resorcinol ("ITR" ester units) of formula (7c)

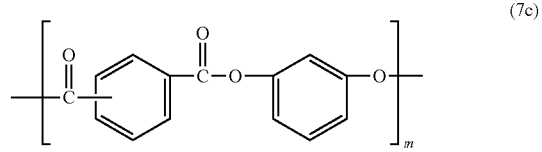

wherein m is 4 to 100, 4 to 90, 5 to 70, more specifically 5 to 50, or still more specifically 10 to 30. In an embodiment, the ITR ester units are present in the polycarbonate copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers. Certain ITR-PC copolymers have inherently low smoke density properties. In these copolymers, the addition of the polyetherimides significantly reduces the heat release of the copolymers.

A specific example of a poly(carbonate)-co-(monoaryl arylate ester) is a poly(bisphenol-A carbonate)-co-(isophthalate-terephthalate-resorcinol ester) of formula (8c)

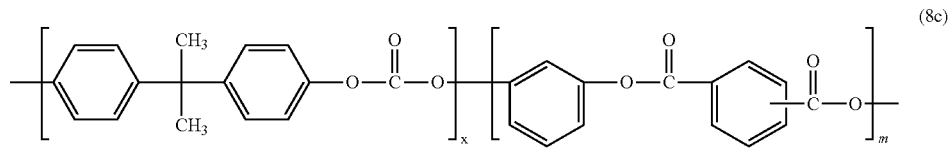

wherein m is 4 to 100, 4 to 90, 5 to 70, more specifically 5 to 50, or still more specifically 10 to 30, and the mole ratio of x:n is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination thereof can be present, in a total amount of 1 to 20 mole % based on the total moles of units in the copolymers, for example resorcinol carbonate units of the formula

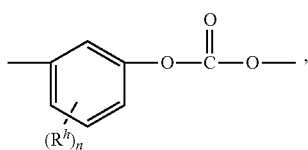

and bisphenol-A phthalate ester units of the formula

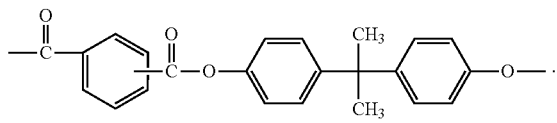

In an embodiment, poly(bisphenol-A carbonate)-co-(isophthalate-terephthalate-resorcinol ester) (8c) comprises 1 to 20 mol % of bisphenol-A carbonate units, 60-98 mol % of isophthalic acid-terephthalic acid-resorcinol ester units, and optionally 1 to 20 mol % of resorcinol carbonate units, isophthalic acid-terephthalic acid-bisphenol-A phthalate ester units, or a combination thereof.

The polycarbonate copolymers comprising arylate ester units are generally prepared from polyester blocks. The polyester blocks can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used. The polyesters can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

The polycarbonate copolymers comprising arylate ester units can have an $M_w$ of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a cross linked styrene-divinyl benzene column, at a sample concentration of 1 milligram per milliliter, and as calibrated with polycarbonate standards. Samples are eluted at a flow rate of about 1.0 ml/min with methylene chloride as the eluent.

In another embodiment, the polycarbonate copolymers are "PC-siloxane" copolymers that contain bisphenol carbonate units (1) and repeating siloxane units (also known as "diorganosiloxane units"). The polysiloxane units are of formula (9)

wherein each R is independently a $C_{1-13}$ monovalent hydrocarbyl group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination thereof. In an embodiment no halogens are present. Combinations of the foregoing R groups can be used in the same copolymer. In an embodiment, the polysiloxane comprises R groups that have minimal hydrocarbon content. In a specific embodiment, an R group with a minimal hydrocarbon content is a methyl group.

The average value of E in formula (9) can vary widely depending on the type and relative amount of each component in the thermoplastic composition, whether the polymer is linear, branched or a graft copolymer, the desired properties of the composition, and like considerations. In an embodiment, E has an average value of 2 to 500, 2 to 200, or 5 to 100, 10 to 100, 10 to 80, 2 to 30, or 30 to 80. In an embodiment E has an average value of 16 to 50, more specifically 20 to 45, and even more specifically 25 to 45. In another embodiment, E has an average value of 4 to 50, 4 to 15, specifically 5 to 15, more specifically 6 to 15, and still more specifically 7 to 10. In an embodiment, the polysiloxane units are structural units of formula (9a)

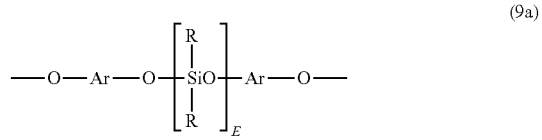

wherein E is as defined above; each R can independently be the same or different, and is as defined above; and each Ar can independently be the same or different, and is a substituted or unsubstituted $C_{6-30}$ compound containing an aromatic group, wherein the bonds are directly connected to the aromatic moiety. The Ar groups in formula (9a) can be derived from a $C_{6-30}$ dihydroxy aromatic compound, for example a bisphenol compound as described above or a monoaryl dihydroxy compound (6) above. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used. In an embodiment, the dihydroxy aromatic compound is unsubstituted, or is does not contain non-aromatic hydrocarbyl substituents such as alkyl, alkoxy, or alkylene substituents.

In a specific embodiment, where Ar is derived from resorcinol, the polysiloxane units are of the formula (9a-1)

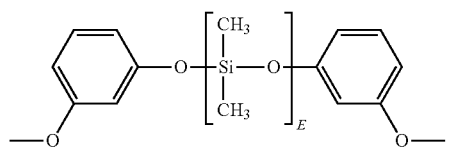
(9a-1)

or, where Ar is derived from bisphenol-A, the polysiloxane has the formula (9a-2)

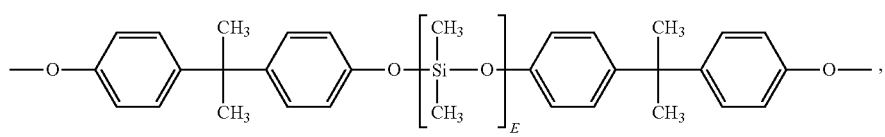
(9a-2)

or a combination comprising at least one of the foregoing can be used, wherein E has an average value as described above, specifically an average value of 2 to 200.

In another embodiment, polydiorganosiloxane units are units of formula (9b)

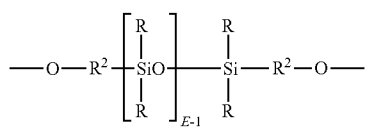
(9b)

wherein R and E are as described for formula (9), and each $R^2$ is independently a divalent $C_{1-30}$ alkylene or $C_{7-30}$ arylene-alkylene. In a specific embodiment, where $R^2$ is $C_{7-30}$ arylene-alkylene, the polydiorganosiloxane units are of formula (9b-1)

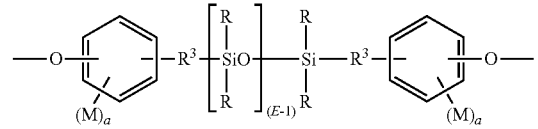
(9b-1)

wherein R and E are as defined for formula (9), and each $R^3$ is independently a divalent $C_{2-8}$ aliphatic group. Each M in formula (25) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

In a specific embodiment, the polysiloxane units are of formula (9b-2)

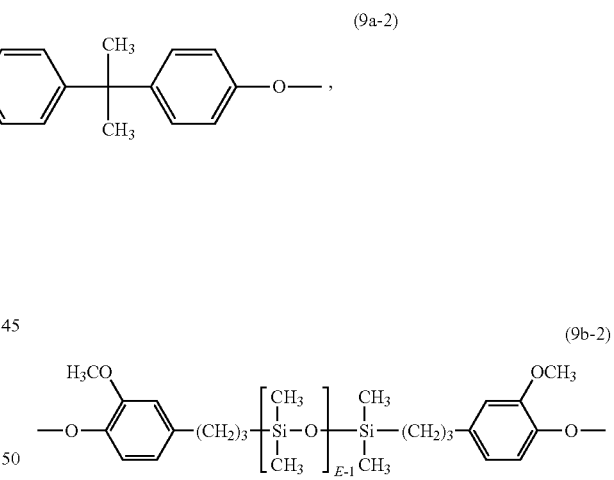
(9b-2)

where E has an average value as described above, specifically 5 to 100, 2 to 30, or 30 to 80. In another specific embodiment, the polysiloxane units are of formula (9b-3)

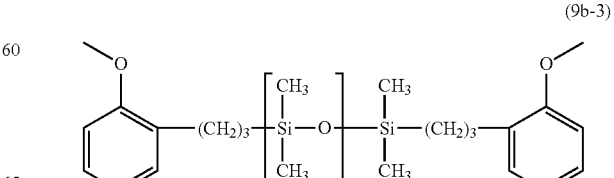
(9b-3)

where E has an average value as defined above, specifically an average value of 5 to 100, 2 to 30, or 30 to 80.

The relative amount of carbonate units (1) and polysiloxane units (9) in the PC-siloxane copolymers depends on the desired properties of the thermoplastic composition, such as impact, smoke density, heat release, and melt viscosity. In particular the polycarbonate copolymer is selected to have an average value of E that provides good impact and/or transparency properties, as well as to provide the desired weight percent of siloxane units in the thermoplastic composition. For example, the polycarbonate copolymers can comprise siloxane units in an amount of 0.3 to 30 weight percent (wt %), specifically 0.5 to 25 wt %, or 0.5 to 15 wt %, based on the total weight of the polymers in the thermoplastic composition, with the proviso that the siloxane units are provided by polysiloxane units covalently bonded in the polymer backbone of the polycarbonate copolymer.

A specific PC-siloxane comprises first carbonate units (1) derived from bisphenol-A, and second repeating siloxane units (9b-2), (9b-3), or a combination thereof. This polycarbonate copolymer can comprise the siloxane units in an amount of 0.1 to 25 weight percent (wt %), 0.2 to 10 wt %, 0.2 to 6 wt % 0.2 to 5 wt %, or 0.25 to 2 wt %, based on the total weight of the polycarbonate copolymer, with the proviso that the siloxane units are covalently bound to the polymer backbone of the polycarbonate copolymer. In an embodiment, the remaining units are bisphenol units (1).

Methods for the manufacture of the PC-siloxane copolymers are known. The PC-siloxane copolymers can have an intrinsic viscosity, as determined in chloroform at 25° C., of 0.3 to 1.5 deciliters per gram (dl/g), specifically 0.45 to 1.0 dl/g. The PC-siloxane copolymers can have a weight average molecular weight ($M_w$) of 10,000 to 100,000 g/mol, as measured by gel permeation chromatography (GPC) using a cross linked styrene-divinyl benzene column, at a sample concentration of 1 milligram per milliliter, and as calibrated with polycarbonate standards.

In still another embodiment, the polycarbonate copolymers comprise bisphenol carbonate units (1) and second units comprising a combination of the bisphenol carbonate units (4), the ester units (7), and the polysiloxane units (9). For example, a polycarbonate copolymer can comprise first bisphenol carbonate units (1), second bisphenol carbonate units (4) different from the first carbonate units, and either ester units (7) or siloxane units (9). In a specific embodiment the polycarbonate copolymer comprises first bisphenol carbonate units (1), arylate ester units (7), and siloxane units (9). Still more specifically, the polycarbonate copolymers comprise comprises first bisphenol carbonate units (1), arylate-monoaryl ester units (7b), specifically ITR ester units (7c), and siloxane units (9). For convenience, these polymers are referred to herein as "PC-ITR-siloxane" copolymers.

In an embodiment, the PC-ITR-siloxane copolymers comprise 1 to 40 mol %, or 1 to 20 mol % of first bisphenol carbonate units (1), 50 to 95 mol % of ITR ester units (7c), and an amount of polysiloxane units (9b), specifically (9b-1), even more specifically (9b-1), (9b-2), or a combination thereof effective to provide 0.1 to 10 wt % of siloxane units, each based on the total copolymer. For example, the PC-ITR-siloxane copolymers can comprise 1 to 20 mol % of bisphenol-A carbonate units, 60 to 90 mole % of ITR ester units, and an amount of polysiloxane units (9b-2), (9b-3), or a combination thereof effective to provide 0.1 to 10 wt % of siloxane units, each based on the total copolymer.

As stated above, the polycarbonate copolymers comprising first bisphenol carbonate units (1), monoaryl-arylate ester units (7b), such as ITR units (7c), and siloxane units (9) can further optionally comprise small amounts of other carbonate units, for example 1 to 20 mole %, of other carbonate units, based on the total moles of units in the copolymers. In an embodiment, the other carbonate unit is derived from monoaryl dihydroxy compound (6). Other arylate ester units can optionally be present, for example 1 to 20 mole % of arylate ester-bisphenol units (7b), based on the total moles of units in the copolymers. A combination of the other carbonate units and other ester units can be present, wherein the total amount of the combination is 1 to 20 mole %. For example, the ITR-PC-siloxane copolymers can further optionally comprise 1 to 20 mole % of resorcinol carbonate units, 1 to 20 mole % of bisphenol-A arylate ester units, each based on the total moles of units in the copolymers. Thus, the ITR-PC-siloxane copolymer can comprise 1 to 40 mol % of bisphenol-A carbonate units, 60 to 98 mol % of isophthalic acid-terephthalic acid-resorcinol ester units, and 1 to 20 mol % of resorcinol carbonate units, isophthalic acid-terephthalic acid-bisphenol-A ester units, or a combination thereof. As above, these polycarbonate copolymers can comprise siloxane units, specifically polysiloxane units (9b-2), (9b-3), or a combination thereof in an amount effective to provide 0.1 to 25 wt %, 0.2 to 10 wt %, 0.2 to 6 wt % 0.2 to 5 wt %, or 0.25 to 2 wt % of siloxane units, based on the total weight of the polycarbonate copolymer, with the proviso that the siloxane units are covalently bound to the polymer backbone of the polycarbonate copolymer.

Methods for the manufacture of the ITR-PC-siloxane copolymers are known. The ITR-PC-siloxane copolymers can have an intrinsic viscosity, as determined in chloroform at 25° C., of 0.3 to 1.5 deciliters per gram (dl/g), specifically 0.45 to 1.0 dl/g. The PC-siloxane copolymers can have a weight average molecular weight ($M_w$) of 10,000 to 100,000 g/mol, as measured by gel permeation chromatography (GPC) using a cross linked styrene-divinyl benzene column, at a sample concentration of 1 milligram per milliliter, and as calibrated with polycarbonate standards.

The low smoke density thermoplastic compositions comprise the above-described polycarbonate copolymers, alone or in combination, and 5 to 30 wt % of a polyetherimide, based on the total weight of the thermoplastic composition. The polyetherimide is of formula (10)

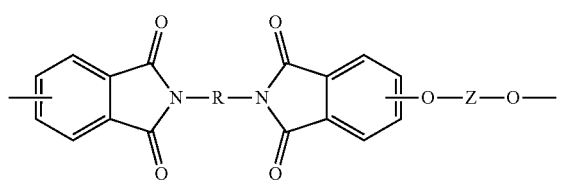

(10)

wherein R is a substituted or unsubstituted divalent organic group having 2 to 20 carbon atoms, for example a substituted or unsubstituted aromatic hydrocarbon group having 6 to 20 carbon atoms or a halogenated derivative thereof, a substituted or unsubstituted, straight or branched chain alkylene group having 2 to 20 carbon atoms, a substituted or unsubstituted cycloalkylene groups having 3 to 20 carbon atoms, or a divalent group of formula (11)

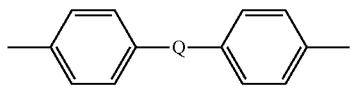

(11)

wherein Q is —O—, —S—, —C(O)—, —SO$_2$—, —SO—, or —C$_y$H$_{2y}$— wherein y is an integer from 1 to 5 or a halogenated derivative thereof.

The group Z in formula (10) is an aromatic C$_{6-24}$ monocyclic or polycyclic group optionally substituted with 1 to 6 C$_{1-8}$ alkyl groups, 1 to 8 halogen atoms, or a combination thereof, wherein the divalent bonds of the —O—Z—O— group are in the 3,3', 3,4', 4,3', or the 4,4' positions.

In an embodiment, R in formula (10) is a divalent radical of one of the following formulas

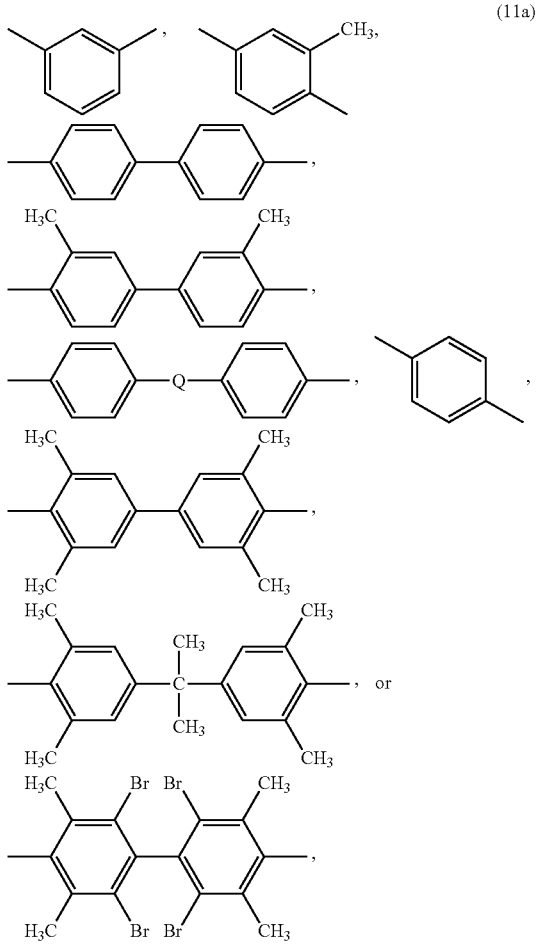

(11a)

wherein Q is —O—, —S—, —C(O)—, —SO$_2$—, —SO—, or —C$_y$H$_{2y}$— wherein y is an integer from 1 to 5 or and a halogenated derivative thereof; and Z is a divalent group of formula (12)

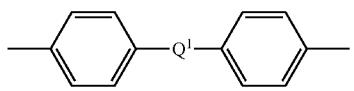

(12)

wherein Q$^1$ is —O—, —S—, —C(O)—, —SO$_2$—, —SO—, or —C$_y$H$_{2y}$— wherein y is an integer from 1 to 5. In an embodiment no halogen substituents are present in the polyetherimide.

Polyetherimides can be obtained by polymerization of an aromatic bisanhydride of formula (13)

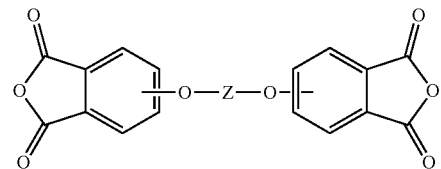

(13)

wherein Z is as described in formula (10), with a diamine of the formula H$_2$N—R—NH$_2$ wherein R is as described in formula (10). Examples of specific aromatic bisanhydrides and organic diamines are disclosed, for example, in U.S. Pat. Nos. 3,972,902 and 4,455,410 incorporated herein by reference in their entirety. Illustrative examples of aromatic bisanhydrides (38) include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures comprising at least one of the foregoing.

Illustrative examples of diamines H$_2$N—R—NH$_2$ include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis (amino-t-butyl)toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis (4-aminophenyl)sulfide, bis(4-aminophenyl)sulfone, bis(4-aminophenyl)ether and 1,3-bis(3-aminopropyl)tetramethyldisiloxane. Combinations comprising at least one of the foregoing aromatic bisanhydrides can be used. Aromatic diamines are often used, especially m- and p-phenylenediamine, sulfonyl dianiline, and combinations thereof.

The thermoplastic compositions can include various other polymers to adjust the properties of the thermoplastic compositions, with the proviso that the other polymers are selected so as to not adversely affect the desired properties of the thermoplastic composition significantly, in particular low smoke density and low heat release. For example, combination of a polycarbonate copolymer as described above and a homopolycarbonate such as a bisphenol-A homopolycarbonate can still provide thermoplastic compositions having the required low smoke density. Other polymers include an impact modifier such as natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like can be present. In general such other polymers provide less than 50 wt %, less than 40 wt %, less than 30 wt %, less than 20 wt %, or less than 10 wt % of the total composition. In an embodiment, no other polymers are present. In a specific embodiment, no polymers containing halogen are present in the thermoplastic compositions.

The thermoplastic compositions can include various additives ordinarily incorporated into flame retardant compositions having low smoke density and low heat release, with the proviso that the additive(s) are selected so as to not adversely affect the desired properties of the thermoplastic composition significantly, in particular low smoke density and low heat release. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, additional flame retardants, and anti-drip agents. A combination of additives can be used. In general, the additives are used in the amounts generally known to be effective. The total amount of additives (other than any filler or reinforcing agents) is generally 0.01 to 25 parts per parts per hundred parts by weight of the polymers (PHR).

The use of pigments such as titanium dioxide produces white compositions, which are commercially desirable. Pigments such as titanium dioxide (or other mineral fillers) can be present in the thermoplastic compositions in amounts of 0 to 12 PHR, 0.1 to 9 PHR, 0.5 to 5 PHR, or 0.5 to 3 PHR.

Exemplary antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 PHR.

Exemplary heat stabilizer additives include organophosphites such as triphenyl phosphite, tris-(2,6-dimethylphenyl)phosphite, and tris-(mixed mono- and di-nonylphenyl)phosphite; phosphonates such as dimethylbenzene phosphonate, phosphates such as trimethyl phosphate; or combinations comprising at least one of the foregoing heat stabilizers. Heat stabilizers are used in amounts of 0.01 to 0.1 PHR.

Light stabilizers and/or ultraviolet light (UV) absorbing additives can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 PHR.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers, or combinations comprising at least one of the foregoing UV absorbers. UV absorbers are used in amounts of 0.01 to 5 PHR.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl)isocyanurate; tristearin; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 PHR.

Flame retardant salts are not needed to obtain the desired low smoke and low heat release properties. Examples of flame retardant salts include of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate (KSS); salts such as $Na_2CO_3$, $K_2CO_3$, $MgCO_3$, $CaCO_3$, and $BaCO_3$, phosphate salts, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. In an embodiment, no flame retardant salts are present. When present, flame retardant salts are present in amounts of 0.01 to 10 PHR, more specifically 0.02 to 1 PHR.

Organic flame retardants can be present, for example organic compounds that include phosphorus, nitrogen, bromine, and/or chlorine. However, halogenated flame retardants are generally avoided, such that the thermoplastic composition can be essentially free of chlorine and bromine. "Essentially free of chlorine and bromine" as used herein means having a bromine and/or chlorine content of less than or equal to 100 parts per million by weight (ppm), less than or equal to 75 ppm, or less than or equal to 50 ppm, based on the total parts by weight of the composition, excluding any filler.

In certain embodiments the thermoplastic compositions can further comprise an organophosphorus flame retardant in an amount effective to provide 0.1 to 1.0 wt % phosphorus, based on the weight of the composition. For example, the organophosphorus compound, specifically BPADP or RDP can be present in an amount of 2 to 10 wt %, which is effective to provide 0.1 to 1.0 wt % phosphorus based on the total weight of the composition. Organophosphorus compounds include aromatic organophosphorus compounds having at least one organic aromatic group and at least one phosphorus-containing group, as well as organic compounds having at least one phosphorus-nitrogen bond.

In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more nonaromatic moieties, for example alkyl, alkenyl, alkynyl, or cycloalkyl. The aromatic moiety of the aromatic group can be directly bonded to the phosphorus-containing group, or bonded via another moiety, for example an alkylene group. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol-A), a monoarylene group (e.g., a 1,3-phenylene or a 1,4-phenylene), or a combination comprising at least one of the foregoing.

The phosphorus-containing group can be a phosphate $(P(=O)(OR)_3)$, phosphite $(P(OR)_3)$, phosphonate $(RP(=O)(OR)_2)$, phosphinate $(R_2P(=O)(OR))$, phosphine oxide $(R_3P(=O))$, or phosphine $(R_3P)$, wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula $(GO)_3P=O$, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of formula (14)

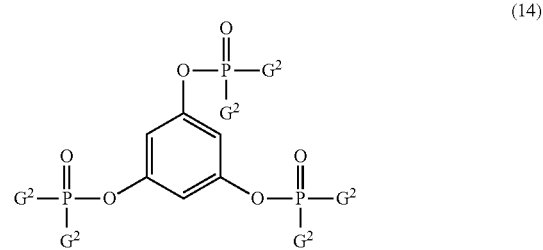

(14)

wherein each $G^2$ is independently a hydrocarbon or hydrocarbonoxy having 1 to 30 carbon atoms. In some embodiments G corresponds to a monomer used to form the polycarbonate, e.g., resorcinol.

Specific aromatic organophosphorus compounds have two or more phosphorus-containing groups, and are inclusive of acid esters of formula (15)

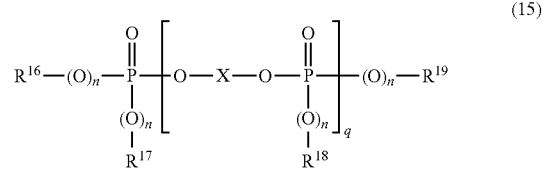

(15)

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is an aromatic group. In some embodiments $R^{16}$, $R^{17}$, $R^{18}$, and $R^{19}$ are each independently $C_{1-4}$ alkyl, naphthyl, phenyl $(C_{1-4})$alkylene, or aryl groups optionally substituted by $C_{1-4}$ alkyl. Specific aryl moieties are cresyl, phenyl, xylenyl, propylphenyl, or butylphenyl. In some embodiments X in formula (15) is a mono- or poly-nuclear aromatic $C_{6-30}$ moiety derived from a diphenol. Further in formula (15), n is each independently 0 or 1; in some embodiments n is equal to 1. Also in formula (15), q is from 0.5 to 30, from 0.8 to 15, from 1 to 5, or from 1 to 2. Specifically, X can be represented by the following divalent groups (16), or a combination comprising one or more of these divalent groups.

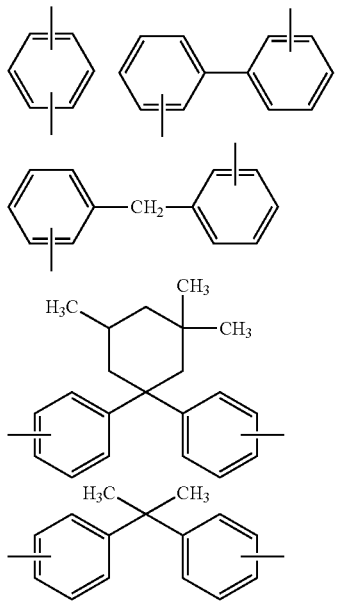

In these embodiments, each of $R^{16}$, $R^{17}$, $R^{18}$, and $R^{19}$ can be aromatic, i.e., phenyl, n is 1, and p is 1-5, specifically 1-2. In some embodiments at least one of $R^{16}$, $R^{17}$, $R^{18}$, $R^{19}$, and X corresponds to a monomer used to form the polycarbonate, e.g., bisphenol-A or resorcinol. In another embodiment, X is derived especially from resorcinol, hydroquinone, bisphenol-A, or diphenylphenol, and $R^{16}$, $R^{17}$, $R^{18}$, $R^{19}$, is aromatic, specifically phenyl. A specific aromatic organophosphorus compound of this type is resorcinol bis(diphenyl phosphate), also known as RDP. Another specific class of aromatic organophosphorus compounds having two or more phosphorus-containing groups are compounds of formula (17)

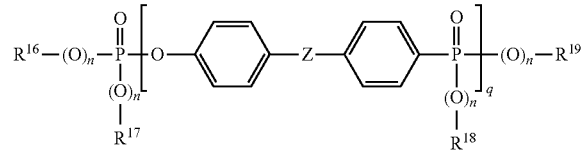

(17)

wherein $R^{16}$, $R^{17}$, $R^{18}$, $R^{19}$, n, and q are as defined for formula (19) and wherein Z is $C_{1-7}$ alkylidene, $C_{1-7}$ alkylene, $C_{5-12}$ cycloalkylidene, —O—, —S—, —SO$_2$—, or —CO—, specifically isopropylidene. A specific aromatic organophosphorus compound of this type is bisphenol-A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

Organophosphorus compounds containing at least one phosphorus-nitrogen bond includes phosphazenes, phosphorus ester amides, phosphoric acid amides, phosphonic acid amides, phosphinic acid amides, and tris(aziridinyl) phosphine oxide. Phosphazenes (18) and cyclic phosphazenes (19)

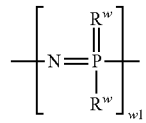

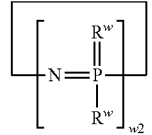

in particular can used, wherein w1 is 3 to 10,000 and w2 is 3 to 25, specifically 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

Accordingly, depending on the particular organophosphorus compound used, the thermoplastic compositions can comprise from 0.3 to 8.5 wt %, or 0.5 to 8.0 wt %, or 3.5 to 7.5 wt % of the organophosphorus flame retardant, each based on the total weight of the composition. Specifically, the organophosphorus compounds can be bisphenol A bis (diphenyl phosphate), triphenyl phosphate, resorcinol bis (diphenyl phosphate), tricresyl phosphate, or a combination comprising at least one of the foregoing.

Anti-drip agents in most embodiments are not used in the thermoplastic compositions. Anti-drip agents include a fibril-forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. Antidrip agents are substantially absent or completely absent from the thermoplastic compositions in some embodiments.

Methods for forming the thermoplastic compositions can vary. In an embodiment, the polymers are combined (e.g., blended) with any additives (e.g., a mold release agent) such as in a screw-type extruder. The polymers any additives can be combined in any order, and in form, for example, powder, granular, filamentous, as a masterbatch, and the like. The thermoplastic compositions can be foamed, extruded into a sheet, or optionally pelletized. Methods of foaming a thermoplastic composition using frothing or physical or chemical blowing agents are known and can be used. The pellets can be used for molding into articles, foaming, or they can be used in forming a sheet of the flame retardant thermoplastic composition. In some embodiments, the composition can be extruded (or co-extruded with a coating or other layer) in the form of a sheet and/or can be processed through calendaring rolls to form the desired sheet.

As discussed above, the thermoplastic compositions are formulated to meet strict low smoke density requirements. The relative amounts of polycarbonate copolymer and polyetherimide in the thermoplastic compositions depends on the particular copolymer and polyetherimide used, the targeted level of smoke density and heat release, and other desired properties of the thermoplastic composition, such as impact strength and flow. In an embodiment, the polyetherimide is present in an amount from 5 to 30 wt %, based on the total weight of the thermoplastic composition, and within this range the specific amount is selected to be effective to provide a smoke density (Ds-4) of less than 300, less than 250, less than 200, less than 150, or less than 100 as determined in accordance with ISO 5659-2 on a 3 mm thick plaque. These values can be obtained in articles having a wide range of thicknesses, for example from 0.1 to 10 mm, or 0.5 to 5 mm.

The thermoplastic compositions can further have a maximum average rate of heat emission (MAHRE) of 90 kW/m$^2$ or less, 75 kW/m$^2$ or less, or 60 kW/m$^2$ or less as measured according to ISO 5660-1 on a 3 mm thick plaque.

Use of the PEI can lower smoke density (Ds-4) to the desired levels. For example, PC-siloxane copolymers such as (bisphenol-A carbonate)-co-(polydimethylsiloxane) and polycarbonate copolymers such as (bisphenol-A carbonate)-co-PPPBP carbonate) have limited inherent smoke properties, such that a combination with 5 to 30 wt % of the polyetherimide has positive effect on the smoke density (Ds-4) as determined according to ISO5659-2 on a 3 mm thick plaque, such that these compositions are suitable for EN-45545 type applications (for R1, R3 and R6 applications qualifying for HL2 compliance, a smoke density (Ds-4) at or below 300 is required), provided that the other required properties (e.g. heat release) meet the selection criteria as well. For ITR-PC-siloxane copolymers such as (ITR ester)-co-(bisphenol-A carbonate)-co-polydimethyl-siloxane)carbonate copolymers with good inherent smoke and heat release properties, a combination with 5 to 30 wt % of the polyetherimide lowers the smoke density (Ds-4), as determined according to ISO 5659-2 on a 3 mm thick plaque, even further so that more stringent fire requirements can be met, more specifically Hazard Level 3 requirements for R6 applications in the EN45545 norm (for R1, R3 and R6 applications qualifying for HL3 compliance, a smoke density (Ds-4) at or below 150 or 300 is required), provided that the other required properties (e.g. heat release) meet the selection criteria as well.

Thus, in some embodiments the compositions can have a smoke density (Ds-4) of 300 or less as determined according to ISO 5659-2 on a 3 mm thick plaque. In a specific embodiment, a thermoplastic composition comprising a combination of ITR-PC with ITR-PC-siloxane has a smoke density (Ds-4) of 150 or less as determined according to ISO 5659-2 and maximum heat release rate (MAHRE) of 90 kW/m$^2$ or less as determined according to ISO 5660-1, both on a 3 mm thick plaque. These values can be obtained in articles having a wide range of thicknesses, for example from 0.1 to 10 mm, or 0.5 to 5 mm. These low smoke density and heat release values are obtained using a combination of an ITR-PC and an ITR-PC-siloxane in a weight ratio of 10:90 to 90:10, specifically 20:80 to 80:20. In an embodiment the ITR-PC comprises ITR and bisphenol-A carbonate units as described above, and the ITR-PC-siloxane comprises ITR ester units, bisphenol-A carbonate units, and siloxane units (9b-2), (9b-3), or a combination thereof as described above. The compositions can further comprise an aromatic organophosphorus compound, e.g., RDP, BPDA, or a combination comprising at least one of the foregoing aromatic organophosphorus compounds.

The thermoplastic compositions can be formulated to have lower densities, in particular a density of 1.35 g/cc or less, 1.34 g/cc or less, 1.33 g/cc or less, 1.32 g/cc or less, 1.31 g/cc or less, 1.30 g/cc or less, or 1.29 g/cc or less. The same or similar values can be obtained in components having a wide range of thicknesses, for example from 0.1 to 10 mm, or 0.5 to 5 mm.

The thermoplastic compositions can further have good melt viscosities, which aid processing. The thermoplastic compositions can have a melt volume flow rate (MVR, cubic centimeter per 10 minutes (cc/10 min), according to of 4 to about 30, greater than or equal to 10, greater than or equal to 12, greater than or equal to 15, greater than or equal to 16, greater than or equal to 17, greater than or equal to 18, greater than or equal to 19, or greater than or equal to 20 cc/min, measured at 300° C./1.2 Kg at 360 second dwell according to ISO 1133. The same or similar values can be obtained in articles having a wide range of thicknesses, for example from 0.1 to 10 mm, or 0.5 to 5 mm.

The thermoplastic compositions can further have excellent impact properties, in particular multiaxial impact (MAI) and ductility. The compositions can have an MAI equal to or higher than 100 J, determined at 23° C. at an impact speed of 4.4 m/second in accordance with ISO 6603 on discs with a thickness of 3.2 mm. The compositions can have a ductility in multiaxial impact of 80% and higher, determined at 23° C. at an impact speed of 4.4 m/second in accordance with ISO 6603 on discs with a thickness of 3.2 mm. These values can be obtained in articles having a wide range of thicknesses, for example from 0.1 to 10 mm, or 0.5 to 5 mm.

As noted above the present discovery allows the manufacture of compositions have very low smoke densities (Ds-4), as determined according to ISO5659-2 on a 3 mm thick plaque and heat release (MAHRE) as determined according to ISO5660-1 on a 3 mm thick plaque, while maintaining the advantageous properties of polycarbonates. Thus, thermoplastic compositions having practical impact properties within 20%, within 10%, within 5%, or within 1% of the same compositions without the polyetherimides can be manufactured. For example, the thermoplastic compositions can have an MAI within 20%, within 10%, within 5%, or within 1% of the MAI of the same composition, each determined at 23° C. at an impact speed of 4.4 m/second in accordance with ISO 6603 on discs with a thickness of 3.2 mm. The white or almost-white color of the polycarbonates can further be maintained.

Shaped, formed, or molded articles comprising the thermoplastic compositions are also provided. The thermoplastic compositions can be molded into useful shaped articles by a variety of means such as injection molding, extrusion, rotational molding, blow molding, and thermoforming to form articles. Thus the thermoplastic compositions can be used to form a foamed article, a molded article, a thermoformed article, an extruded film, an extruded sheet, one or more layers of a multi-layer article (e.g. a cap-layer), a substrate for a coated article, or a substrate for a metallized article.

Illustrative articles include access panels, access doors, air flow regulators air gaspers, air grilles, arm rests, baggage storage doors, balcony components, cabinet walls, ceiling panels, door pulls, door handles, duct housing, enclosures for electronic devices, equipment housings, equipment panels, floor panels, food carts, food trays, galley surfaces, grilles, handles, housings for TVs and displays, light panels, magazine racks, telephone housings, partitions, parts for trolley carts, seat backs, seat components, railing components, seat housings, shelves, side walls, speaker housings, storage compartments, storage housings, toilet seats, tray tables, trays, trim panel, window moldings, window slides, windows, and the like.

In an embodiment, the thermoplastic compositions are formulated to provide articles that meet certain criteria set forth in the new European Railway standard EN-45545 (2013). The European Union has approved the introduction of a set of fire testing standards for the railroad industry that prescribes certain flammability, flame spread rate, heat release, smoke emission, and smoke toxicity requirements for materials used in railway vehicles, known as European Railway standard EN-45545 (2013). Based on the vehicle material, end-use, and fire risks, 26 different "Requirement" categories for materials have been established (R1-R26).

Passenger seat shells (both back and base shell) fall under the R6 application type. Lighting strips fall under the R3 application type. The R1 application type covers, amongst others, interior vertical and horizontal surfaces, such as side walls, front/end walls, doors, ceiling panels, as well as luggage racks, linings and frames.

"Hazard Levels" (HL1 to HL3) have been designated, reflecting the degree of probability of personal injury as the result of a fire. The levels are based on dwell time and are related to operation and design categories. HL1 is the lowest hazard level and is typically applicable to vehicles that run under relatively safe conditions (easy evacuation of the vehicle). HL3 is the highest hazard level and represents most dangerous operation/design categories (difficult and/or time-consuming evacuation of the vehicle, e.g. in underground rail cars). For each application type, different test requirements for the hazard levels are defined. The testing methods, and smoke density (Ds-4) and maximum heat release (MAHRE) values for the various hazard levels in the European Railway standard EN-45545 (2013) are shown in Table 1B for R6 applications.

TABLE 1B

European Railways Standard EN 45545 for R6 applications

| Hazard Level | Smoke Density, DS-4 ISO 5659-2 | Heat release, MAHRE (kW/m$^2$) ISO 5660-1 |
|---|---|---|
| HL1 | ≤600 | — |
| HL2 | ≤300 | ≤90 |
| HL3 | ≤150 | ≤60 |

Data in the Examples shows that the compositions herein can meet the requirements for HL2, and some compositions can meet the requirements for HL3.

Thus, while thermoplastic compositions can be used for the manufacture of a wide variety of articles, including high occupancy structures such as rail stations, airports and office buildings, the thermoplastic compositions are especially useful for the manufacture of transportation components.

As used herein, a "transportation component" is an article or portion of an article used in rolling stock, an aircraft, a roadway vehicle, or a marine vehicle. "Rolling stock" includes but is not limited to a locomotive, coach, light rail vehicle, underground rail vehicle, tram, trolley, magnetic levitation vehicle, and a cable car. An "aircraft" includes but is not limited to a jet, an airplane, an airship, a helicopter, a balloon, and a spacecraft. A "roadway vehicle" includes but is not limited to an automobile, bus, scooter and a motor-cycle. A "marine vehicle" includes but is not limited to a boat, a ship (including freight and passenger ships), jet skis, and a submarine.

Exemplary transportation components for rolling stock (e.g. trains), aircraft, and roadway and marine vehicles, particularly rolling stock, includes interior components (e.g., structure and coverings) such as ceiling paneling, flaps, boxes, hoods, louvers, insulation material and the body shell in interiors, side walls, front walls/end walls, partitions, room dividers, interior doors, interior lining of the front-/end-wall doors and external doors, luggage overhead luggage racks, vertical luggage rack, luggage container, luggage compartments, windows, window frames, kitchen interiors, surfaces or a component assembly comprising at least one of the foregoing. In an embodiment any of the foregoing articles are in compliance with European Rail Standard EN-45545, for example meeting HL2 or HL3.

The thermoplastic compositions are particularly useful in train and aircraft, for example a variety of aircraft compartment interior applications, as well as interior applications for other modes of transportation, such as bus, train, subway, marine, and the like. In a specific embodiment the articles are interior components for aircraft or trains, including access panels, access doors, air flow regulators baggage storage doors, display panels, display units, door handles, door pulls, enclosures for electronic devices, food carts, food trays, grilles, handles, magazine racks, seat components, partitions, refrigerator doors, seat backs, side walls, tray tables, trim panels, and the like. The poly(siloxane) copolymer compositions can be formed (e.g., molded) into sheets that can be used for any of the above mentioned components. It is generally noted that the overall size, shape, thickness, optical properties, and the like of the polycarbonate sheet can vary depending upon the desired application. In an embodiment any of the foregoing articles are in compliance with European Rail Standard EN-45545, for example meeting HL2 or HL3.

Certain of the above-described compositions are particularly useful for the manufacture of a transportation component, in particular an aircraft component or a rolling stock component (e.g., a train component) having a smoke density (Ds-4) of less than 300, less than 180, or less than 150 (measured in accordance with ISO 5659-2 on a 3 mm thick plaque), and a MAHRE of less than 90 kW/m$^2$, or less than 60 (measured using ISO 5660-1 on a 3 mm thick plaque). Such materials can be in compliance with EN-45545 (2013), for example meeting HL2 or HL3. In an embodiment these compositions comprise the PC-siloxane, or the PC-siloxane in combination with another polycarbonate copolymer or homopolycarbonate together with 5 to 30 wt % of PEI. An organophosphorus compound can be present in the compositions. In particular, PC-siloxanes containing bisphenol-A carbonate units and polysiloxane units of formulas (9a), (9b), or a combination thereof can be used, optionally in combination with a bisphenol-A homopolycarbonate, and further optionally in combination with an aromatic organophosphorus compound such as RDP or BPADP in an amount effective to provide 0.1 to 1.0 wt % of phosphorus. The same compositions without PEI either do not meet strict low smoke density (Ds-4) standards, failing to meet Hazard Level 2 requirements for EN45545 compliance, requiring a Ds-4 equal to or below 300. However, the thermoplastic compositions with the polyetherimide have Ds-4 values lower than 300, as determined according to ISO 5659-2 on 3 mm thick plaques, and as such can meet the smoke density requirements for Hazard Level 2 applications according to EN45545 (requiring Ds-4 values equal to or lower than 300)

and simultaneously have very low heat release (MAHRE) properties without compromising mechanical properties such as impact resistance and processability. These values can be obtained in articles having a wide range of thicknesses, for example from 0.1 to 10 mm, or 0.5 to 5 mm.

In another embodiment these compositions comprise an ITR-PC, and ITR-PC-siloxane copolymer, or a combination of an ITR-PC and an ITR-PC-siloxane copolymer together with 5 to 30 wt % of PEI. An organophosphorus compound can be present in the compositions. The ITR-PC can comprise ITR ester units and bisphenol-A carbonate units, and the ITR-PC-siloxane copolymer can comprise ITR ester units, bisphenol-A carbonate units, and polysiloxane units of formulas (9a), (9b), or a combination thereof, and an organophosphorus compound can be present, such as RDP or BPADP in an amount effective to provide 0.1 to 1.0 wt % of phosphorus. The same compositions without PEI only have smoke density (Ds-4) values below 300, as determined according to ISO5659-2 on 3 mm thick samples, which would make them suitable for Hazard Level 2 applications according to EN45545 (requiring Ds-4 values equal to or lower than 300). However, the thermoplastic compositions with the polyetherimide have Ds-4 values below 150, as determined according to ISO5659-2 on 3 mm thick plaques and as such can meet the smoke density requirements for the most stringent Hazard Level 3 for EN45545 applications (requiring Ds-4 values equal to or below 150) and simultaneously have very low heat-release properties without compromising mechanical properties such as impact resistance and processability.

The thermoplastic compositions having low smoke density and low heat release rates are further illustrated by the following non-limiting examples.

EXAMPLES

Materials for the following examples are listed in Table 2.

TABLE 2

| Component | Trade name, Description | Source |
|---|---|---|
| ITR-PC | Isophthalic acid-terephthalic acid-resorcinol)-bisphenol-A poly(ester-co-carbonate), ester content 83 mol %, interfacial polymerization, Mw = 19,000 to 23,000 g/mol (determined via GPC using polycarbonate standards), PCP end-capped | SABIC INNOVATIVE PLASTICS |
| ITR-PC-siloxane | Isophthalic acid-terephthalic acid-resorcinol)-bisphenol-A poly(ester-co-carbonate) with poly(siloxane) blocks, ester content 83 mol %, poly(siloxane) content 1 wt % (average chain length about 10 units), interfacial polymerization, Mw = 22,500 to 26,500 g/mol (determined via GPC using polycarbonate standards), PCP end-capped | SABIC INNOVATIVE PLASTICS |
| PEI | polyetherimide made via reaction of bisphenol-A dianhydride with equimolar amount of m-phenylene diamine, Mw = 31,000 to 35,000 g/mol (determined via GPC using polystyrene standards) | SABIC INNOVATIVE PLASTICS |
| PPPBP-BPA | N-phenylphenolphthaleinylbisphenol, 2,2-bis(4-hydro))-bisphenol-A copolymer, 32 mol % PPPBP, Mw = 23,000 to 27,000 g/mol (determined via GPC using polycarbonate standards), manufactured by interfacial polymerization | SABIC INNOVATIVE PLASTICS |
| BPA-PC | Bisphenol-A polycarbonate, manufactured by interfacial polymerization, Mw = 28,000 to 32,000 g/mol (determined via GPC using polycarbonate standards) | SABIC INNOVATIVE PLASTICS |
| PPSU | Radel 5100; poly(phenylenesulfone) | SOLVAY |
| PC-siloxane | PDMS (polydimethylsiloxane) - bisphenol-A copolymer, 6 mol wt % siloxane having an average block length of 40-50 units, Mw 23,000 g/mol (determined via GPC using polycarbonate standards), manufactured by interfacial polymerization | SABIC INNOVATIVE PLASTICS |
| PEPQ | Tetrakis(2,4-di-tert-butylphenyl)[1,1-biphenyl]-4,4'diylbisphosphonite | Clariant |
| IRGAPHOS 168 | Tris(di-t-butylphenyl)phosphite | BASF |
| IRGANOX 1076 | Octadecyl-3-(3,5-di-tert-butyl-4-hydroxyphenyl) propionate | BASF |
| $TiO_2$ | Coated titanium dioxide | DuPont Titanium |
| Carbon black | Amorphous Carbon | Cabot |

The tests performed are summarized in Table 3.

TABLE 3

| Description | Test | Specimen | Property | Units |
|---|---|---|---|---|
| ISO Smoke density | ISO 5659-2 | plaque 75 × 75 × 3 mm | DS-4 | [—] |
| ISO Heat release | ISO 5660-1 | plaque 100 × 100 × 3 mm | MAHRE | $kW/m^2$ |
| Melt volume flow rate at 300° C. | ISO 1133 | Pellets | MVR | cc/10 min |
| Izod Notched Impact, 23° C., 5.5 J | ISO 180/1A | Multi-purpose ISO 3167 Type A, 4 mm thickness | INI | $kJ/m^2$ |
| Multiaxial Impact, 23° C., 4.4 m/s | ISO 6603 | Disc, 3.2 mm thickness, 100 mm diameter | MAI | J |

Smoke density measurements were performed on 7.5×7.5 cm plaques with 3 mm thickness using a National Bureau of Standards (NBS) Smoke Density Chamber from Fire Testing Technology Ltd (West Sussex, United Kingdom). All measurements were performed according to ISO5659-2, with an irradiance of 50 kW/m² at the sample position and a sample-to-cone distance of 5 cm in view of the charring behavior of the samples (as prescribed by ISO5659-2). Ds-4 was determined as the measured smoke density after 240 seconds.

Heat release measurements were performed on 10×10 cm plaques with 3 mm thickness using a Cone Calorimeter. All measurements were performed according to ISO 5660-1, with an irradiation of 50 kW/m² at the sample position and a sample-to-cone distance of 6 cm in view of the charring behavior of the samples (as prescribed by ISO5660-1).

The smoke density and heat release tests executed are indicative tests. They were performed according to their respective ISO standards, but were not executed by an officially certified test institute.

Blending, Extrusion, and Molding Conditions

The compositions were made as follows. All solid additives (e.g., stabilizers, colorants, solid flame retardants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The liquid flame retardants (e.g., BPADP) were fed before the vacuum using a liquid injection system. It will be recognized by one skilled in the art that the method is not limited to these temperatures or processing equipment.

Extrusion of all materials was performed on a 25 mm Werner-Pfleiderer ZAK twin-screw extruder (L/D ratio of 33/1 with a vacuum port located near the die face. The extruder has 9 zones, which were set at temperatures of 40° C. (feed zone), 200° C. (zone 1), 250° C. (zone 2), 270° C. (zone 3) and 280-300° C. (zone 4 to 8). Screw speed was 300 rpm and throughput was between 15 and 25 kg/hr.

The compositions were molded after drying at 100-110° C. for 6 hours on a 45-ton Engel molding machine with 22 mm screw or 75-ton Engel molding machine with 30 mm screw operating at a temperature 270-300° C. with a mold temperature of 70-90° C. It will be recognized by one skilled in the art that the method is not limited to these temperatures or processing equipment.

Examples 1-8

Examples 1-8 demonstrate the effect of the addition of polyetherimide (PEI) to Isophthalic acid-terephthalic acid-resorcinol)-bisphenol-A poly(ester-co-carbonate) (ITR-PC) copolymers on smoke density (Ds-4) and heat release (MAHRE) properties as well as mechanical properties. Formulations and results are shown in Table 4.

TABLE 4

|  | CEx1 | Ex2 | Ex3 | Ex4 | Ex5 | CEx6 | Ex7 | CEx8 |
| --- | --- | --- | --- | --- | --- | --- | --- | --- |
| Component |  |  |  |  |  |  |  |  |
| ITR-PC | 99.94 | 89.94 | 79.94 | 74.94 | 69.94 | 59.94 | 39.94 | — |
| PEPQ | 0.06 | 0.06 | 0.06 | 0.06 | 0.06 | 0.06 | 0.06 | — |
| PEI |  | 10 | 20 | 25 | 30 | 40 | 60 | 100 |
| Property |  |  |  |  |  |  |  |  |
| INI, 23° C., 5.5 J | 16 | 13 | 11 | 10 | 9 | 8 | 6 | 5 |
| MAI, 23° C., 4.4 m/s | 119 | 120 | 135 | 135 | 121 | 143 | 133 | 10 |
| MAI, ductility % | 100 | 80-100 | 80-100 | 80-100 | 80-100 | 80-100 | 20 | 0 |
| MVR, 330° C., 2.16 kg | 64.3 | 48.5 | 35.2 | 34.2 | 31.9 | 24.4 | 15.6 | — |
| Smoke density, DS-4 | 186 | 93 | 77 | 76 | 69 | — | — | 72 |
| Heat release, MAHRE | 125 | — | 98 | — | 81 | 79 | — | 45 |

As shown in Table 4 and illustrated graphically in FIG. 1, smoke density (Ds-4) decreases upon addition of PEI, with values similar to 100 wt % PEI obtained already at 20-30 wt % of PEI loading (Ds-4 of 77, 76 and 69 for 20, 25 and 30% respectively, compared to Ds-4 of 72 for 100 wt % PEI, all measured on 3 mm thick plaques). As shown in FIG. 1, the decrease in smoke density (Ds-4) as a function of fractional concentration of PEI is non-linear, following a behavior indicating strong interaction between the PEI and the ITR-PC copolymer. An interaction parameter k was calculated based on the following equation.

$$Ds_{Blend} = \frac{w_{ITR-PC} Ds_{ITR-PC}^{Pure} + k w_{PEI} Ds_{PEI}^{pure}}{w_{ITR-PC} + k w_{PEI}} \quad \text{(Eq. 1)}$$

where $W_{ITR-PC}$ and $W_{PEI}$ are the fractional concentration of the ITR-PC and PEI copolymers respectively;
k is the interaction parameter; and
Ds is the smoke density.

The interaction parameter (k) is much larger (k=52.7), than expected based upon simple rules of mixture (k=1, indicating no interaction), which results in compositions with smoke densities (Ds-4) comparable to 100 wt % PEI, as determined according to ISO 5659-2 on 3 mm thick plaques, with significant benefits in flow and impact properties. The compositions containing up to 30% of polyetherimide have similar multiaxial impact properties, both impact energy (120-135 J) and ductility (80-100%), as determined according to ISO 6603 on 3.2 mm thick discs, as the composition without polyetherimide (CEx1, impact energy of 119 J and ductility of 100%). In contrast, compositions containing high amounts of polyetherimide (CEx7) or only polyetherimide (CEx8) have significantly worse ductility levels (20% and 0% for CEx6 and CEx7 respectively) and/or impact energy (10 J for CEx7) than the composition containing only polycarbonate copolymer (CEx1).

The results demonstrate that ITR-PC-siloxane copolymers with 10-30% PEI based on the weight of the composition has a smoke density (Ds-4) below 150 as determined according to ISO 5659-2 on 3 mm thick plaque, which qualifies for rail components of Hazard Level 3 designation according to the European Railway Standard EN 45545 (for R6 applications qualifying for HL3 compliance, a smoke density (Ds-4) at or below 150 is required), provided that the other required properties (e.g. heat release) meet the selection criteria as well, whereas formulations without PEI do not meet these HL3 requirements for Ds-4 (e.g. CEx1 has a Ds-4 of 186 as determined according to ISO5659-2 on 3 mm thick plaque, which would only meet HL2, requiring Ds-4≤300 for R6 applications).).

Examples 9-12

Examples 9-12 demonstrate the effect of the addition of polyetherimide (PEI) to polycarbonate copolymer combinations with high isophthalic acid-terephthalic acid-resorcinol contents, namely ITR-PC-siloxane copolymers and ITR-PC copolymers on smoke density (Ds-4). Formulations and results are shown in Table 5.

TABLE 5

|  | Ex9 | Ex10 | CEx11 | CEx12 |
|---|---|---|---|---|
| Component |  |  |  |  |
| ITR-PC-siloxane | 44.97 | 38.92 | 49.97 | 0 |
| ITR-PC | 44.97 | 38.92 | 49.97 | 0 |
| PEPQ | 0.06 | 0.06 | 0.06 | 0 |
| TiO$_2$ | 2.0 | 2.0 | 2.0 | 0 |
| Carbon black | 0.10 | 0.1 | 0.10 | 0 |
| PEI | 10 | 20 | 0 | 100 |
| Property |  |  |  |  |
| DS-4 | 111 | 76 | 158 | 72 |

Figure 7:
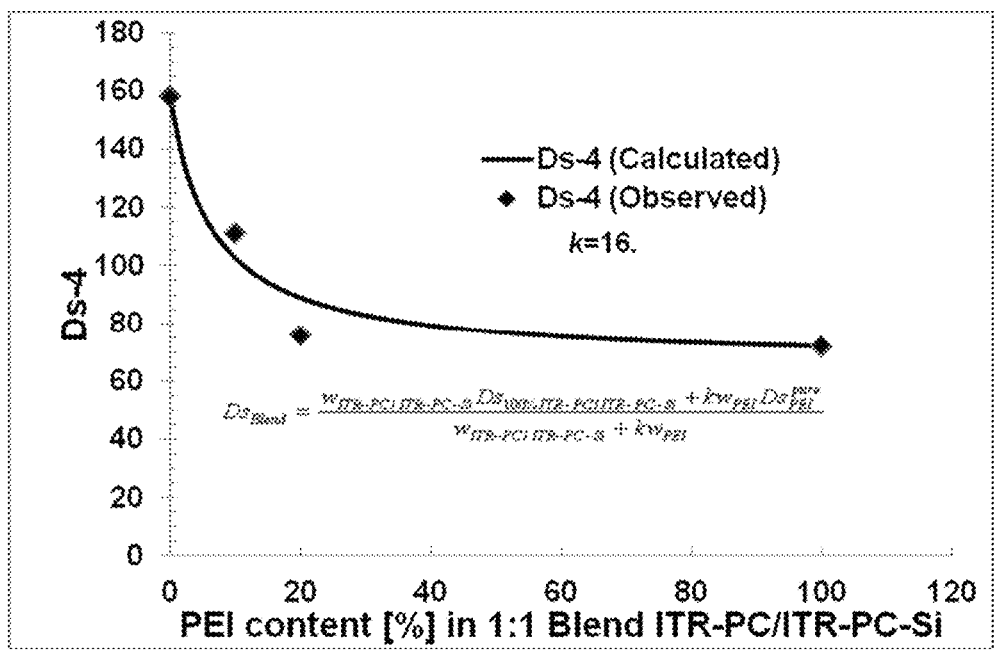
FIG. 7 shows the effect of an increase in fractional concentration (wt %) of a polyetherimide in a combination of an ITR-PC copolymer and an ITR-PC-Si copolymer on smoke density (Ds-4), indicating an interaction behavior.

As shown in Table 5 and illustrated in FIG. 7, smoke density (Ds-4) decreases upon addition of PEI, with values similar to 100 wt % PEI already at 20 wt % of PEI loading (DS-4 of 76, compared to DS-4 of 72 for 100 wt % PEI, all measured on a 3 mm thick plaque).

Similar to ITR-PC copolymers alone, the interaction parameter (k) was calculated for the ITR-PC/ITR-PC-siloxane combination using the equation $$Ds_{Blend} = \frac{w_{ITR-PC/ITR-PC-Si} Ds_{100\% \ ITR-PC/ITR-PC-Si} + kw_{PEI} Ds_{PEI}^{pure}}{w_{ITR-PC/ITR-PC-Si} + kw_{PEI}} \quad \text{(Equ. 2)}$$

The calculated interaction parameter (k=16.4) is much larger than expected based upon simple rules of mixture (k=1), which results in compositions with smoke densities comparable to 100 wt % PEI, at PEI fractional concentrations of 20% (Ex. 10).

The results demonstrate that combinations of ITR-PC-siloxane and ITR-PC copolymers having 10 wt % and 20 wt % PEI have a smoke density (Ds-4) below 150 as determined according to ISO5659-2 on a 3 mm thick plaque, which qualifies these compositions for forming rail components of Hazard Level 3 designation according to the European Railway Standard EN 45545 (for R6 applications qualifying for HL3 compliance, a smoke density (Ds-4) at or below 150 is required), provided that the other required properties (e.g. heat release) meet the selection criteria as well, whereas identical formulations without PEI do not meet these HL3 requirements for Ds-4 (e.g. CEx11 has a Ds-4 of 158 as determined according to ISO5659-2 on a 3 mm thick plaque, which only meets HL2 requiring Ds-4≤300 for R6 applications).).

Examples 13-17

To determine whether the observed non-linear effect on smoke density (Ds-4) occurs, polymers with inherently low smoke density values different than PEI, were used as additives. Examples 13-17 demonstrate the effect of the addition of PPSU to ITR-PC copolymer. Formulations and results are shown in Table 6.

TABLE 6

|  | CEx13 | CEx14 | CEx15 | CEx16 | CEx17 |
|---|---|---|---|---|---|
| Component |  |  |  |  |  |
| ITR-PC | 100 | 90 | 80 | 70 | 0 |
| PPSU | 0 | 10 | 20 | 30 | 100 |
| Property |  |  |  |  |  |
| Smoke density, DS-4 | 186 | 194 | 194 | 133 | 67 |

Figure 2:
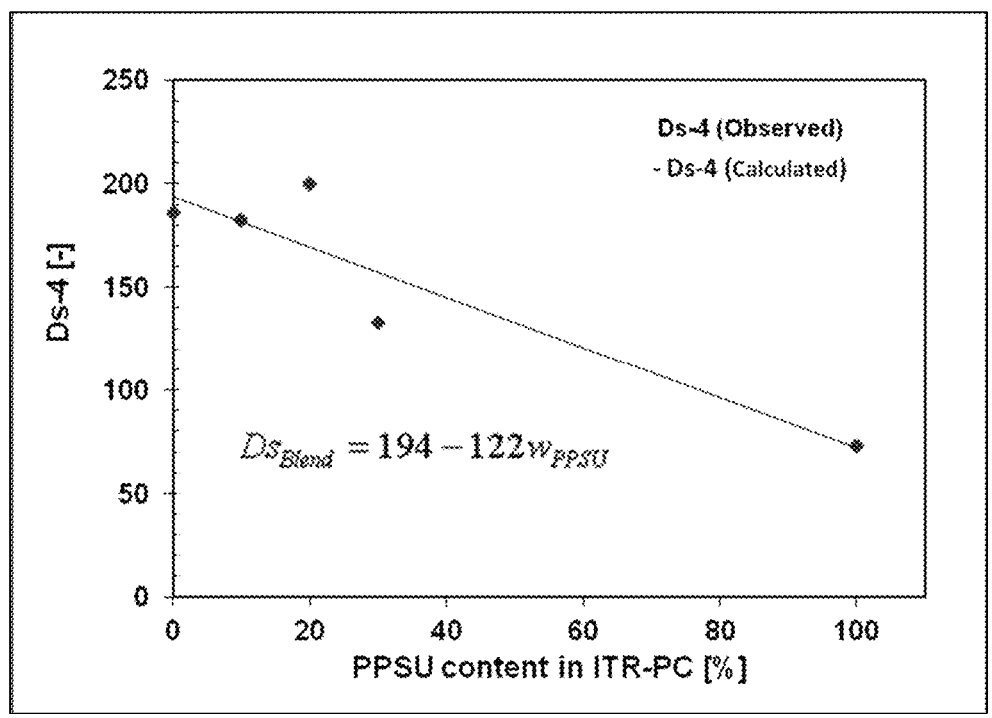
FIG. 2 shows the effect of an increase in fractional concentration (wt %) of a poly(phenylsulfone) (PPSU) in an ITR-PC copolymer on smoke density (Ds-4), indicating the absence of interaction behavior.

As shown in Table 6 and FIG. 2, there is no decrease in smoke density (Ds-4) as a function of PPSU loading beyond the expected by rules of mixture for these compositions (k=1), unlike the results observed for the addition of PEI to ITR-PC copolymers and combinations of ITR-PC with ITR-PC-siloxane copolymers. Rather, the effect is linear. The results demonstrate that the observed interactive, non-linear effect of PEI addition to high ITR content polycarbonate copolymer on the smoke density is unexpected and does not translate automatically to other polymers with inherently very low smoke density values similar to PEI.

Examples 18-22

To determine whether the non-linear effect on smoke density (Ds-4) upon PEI addition occurs with other polycarbonate copolymers as well, Examples 18-22 demonstrate the effect of the addition of PEI to PPPBP-PC copolymers. Table 7 shows the formulations and results.

TABLE 7

|  | CEx18 | Ex19 | Ex20 | Ex21 | CEx22 |
|---|---|---|---|---|---|
| Component |  |  |  |  |  |
| PPPBP-BPA | 100 | 90 | 80 | 70 | 0 |
| PEI | 0 | 10 | 20 | 30 | 100 |
| Property |  |  |  |  |  |
| Smoke density, DS-4 | 626 | 493 | 240 | 245 | 72 |

Figure 3:
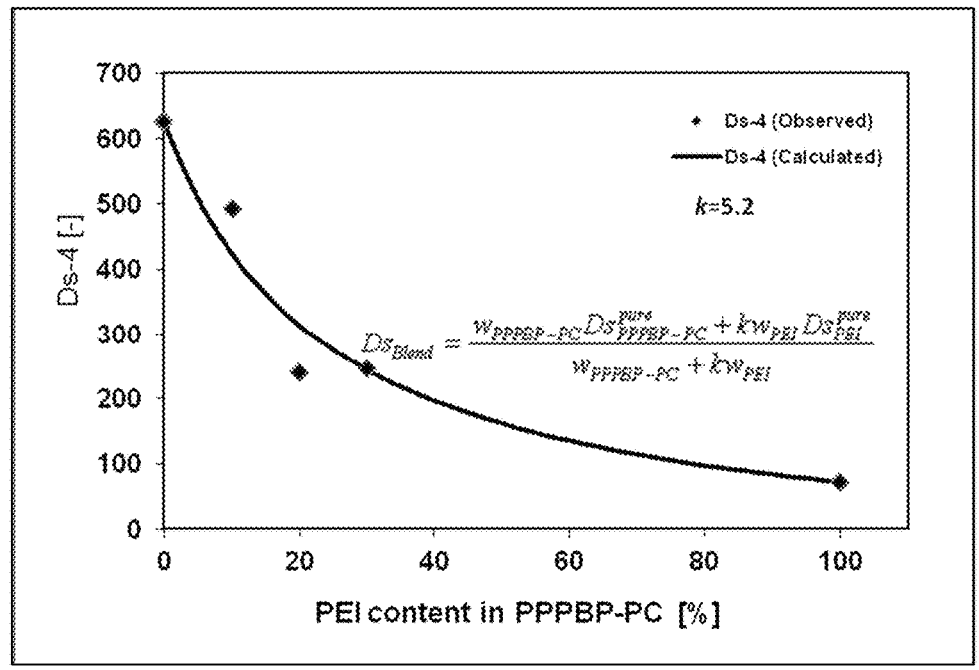
FIG. 3 shows the effect of an increase in fractional concentration (wt %) of a polyetherimide in a PPPBP-BPA copolymer on smoke density (Ds-4), indicating an interaction behavior.

As shown in Table 7 and FIG. 3, the decrease in smoke density (Ds-4) as a function of PEI loading is non-linear and much larger than expected based upon simple rules of mixture (k=5.2 calculated according to the Equation in FIG. 3).

The addition of PEI to PPPBP-BPA copolymers reduces the smoke density to such an extent that formulations containing PEI have smoke density (Ds-4) values below 300

(Ds-4 about 250 as determined according to ISO5659-2 on a 3 mm thick plaque on 3 mm thick plaque), which would make them suitable for EN-45545 type applications (for R1, R3 and R6 applications qualifying for HL2 compliance, a smoke density (Ds-4) at or below 300 is required, while for HL3 compliance, a smoke density (Ds-4) at or below 150 is required), provided that the other required properties (e.g. heat release) meet the selection criteria as well, whereas formulations without PEI do not meet these HL2 requirements for Ds-4 (Ds-4 of 626 for CEx18 as determined according to ISO5659-2 on a 3 mm thick plaque, which would fail to meet even HL-1, requiring Ds-4≤600 for R6 applications).

Examples 23-26

To determine whether the non-linear effect on smoke density (Ds-4) holds for other polycarbonates containing siloxanes, PEI was added in increasing concentrations to a PC-siloxane and smoke density was measured. Results and formulations are shown in Table 8.

TABLE 8

|  | CEx23 | Ex24 | Ex25 | CEx26 |
|---|---|---|---|---|
| Component |  |  |  |  |
| PC-siloxane | 99.88 | 84.88 | 69.88 | 0 |
| IRGANOX 1076 | 0.04 | 0.04 | 0.04 | 0 |
| IRGAPHOS 168 | 0.08 | 0.08 | 0.08 | 0 |
| PEI | 0 | 15 | 30 | 100 |
| Property |  |  |  |  |
| Smoke density, DS-4 | 935 | 198 | 166 | 72 |

Figure 4:
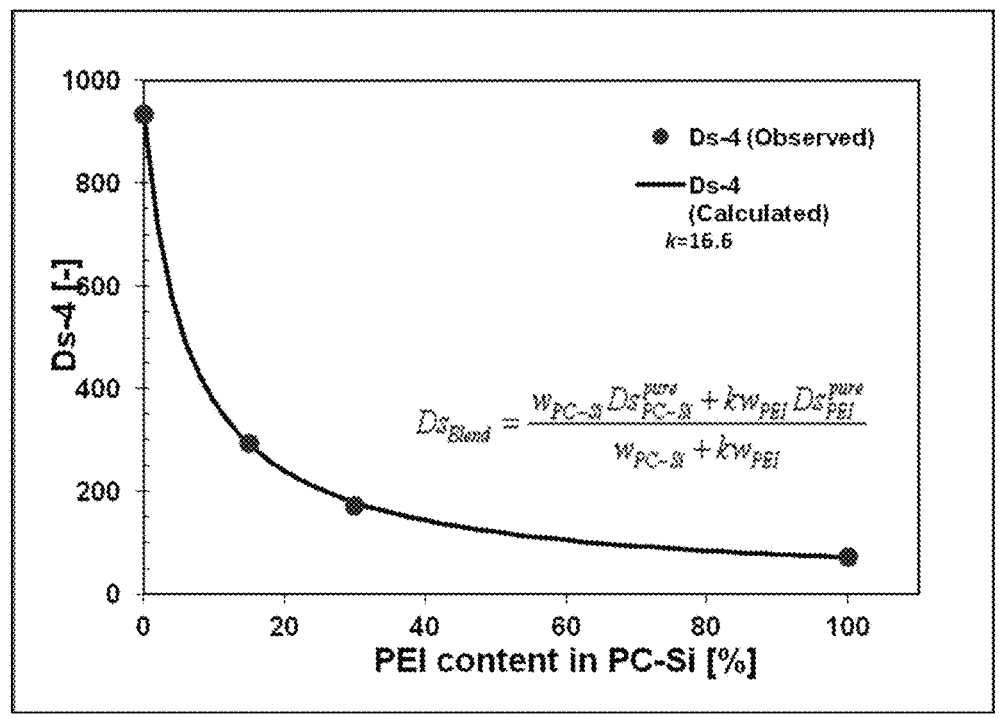
FIG. 4 shows the effect of the increase in fractional concentration (wt %) of a polyetherimide in a transparent PC-siloxane copolymer on smoke density (Ds-4), indicating an interaction behavior.

As shown in Table 9 and FIG. 4, the decrease in smoke density (Ds-4) as a function of PEI concentration is non-linear and much larger than expected based upon simple rules of mixture (k=16.2 calculated according to the Equation in FIG. 4).

The addition of PEI to PC-siloxane copolymers reduces the smoke density (Ds-4) to such an extent that formulations containing PEI have smoke density (Ds-4) values (Ds-4 of 198 and 166 respectively, as determined according to ISO5659-2 on 3 mm thick plaque at 15% and 30% PEI, Ex24 and Ex25) below 300, which would make them suitable for EN-45545 type applications (for R6 applications qualifying for HL2 compliance, a smoke density (Ds-4) at or below 300 is required), provided that the other required properties (e.g. heat release) meet the requirements as well, whereas formulations without PEI do not meet these requirements (see e.g. CEx23, having Ds-4 of 935 as determined according to ISO5659-2 on 3 mm thick plaque, which would fail to meet even HL-1, requiring Ds-4≤600 for R6 applications).

Examples 27-30

To determine whether the non-linear effect on smoke density (Ds-4) is true for polycarbonate homopolymers, PEI at different concentrations was added to a polycarbonate homopolymer (PC). Results and formulations are shown in Table 9.

TABLE 9

|  | CEx27 | Ex28 | Ex29 | CEx30 |
|---|---|---|---|---|
| Component |  |  |  |  |
| PC | 99.88 | 84.88 | 69.88 | 0 |
| IRGANOX 1076 | 0.04 | 0.04 | 0.04 | 0 |
| IRGAPHOS 168 | 0.08 | 0.08 | 0.08 | 0 |
| PEI | 0 | 15 | 30 | 100 |
| Property |  |  |  |  |
| Smoke density, DS-4 | 1320 | 703 | 493 | 72 |

Figure 5:
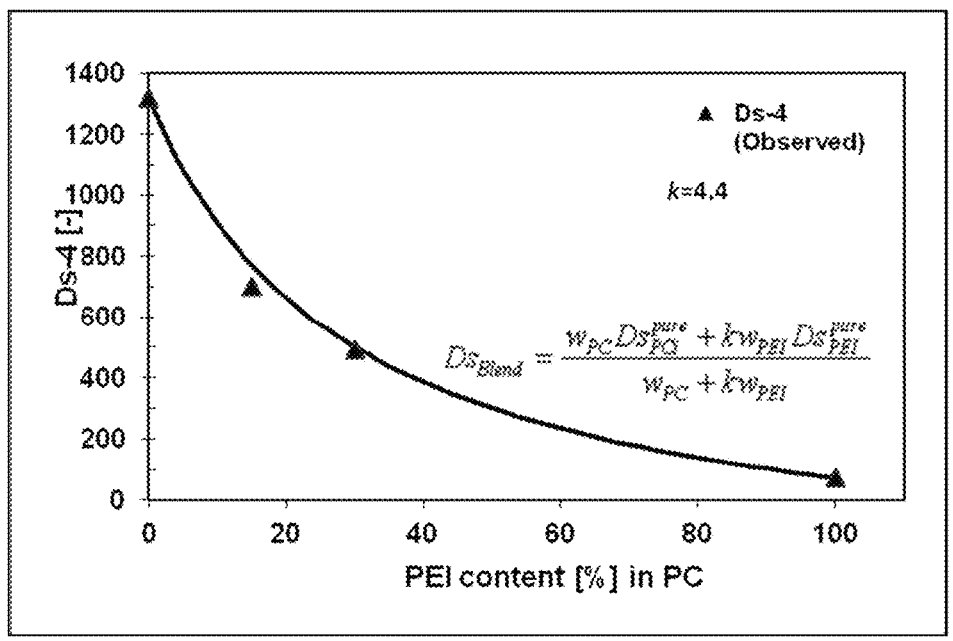
FIG. 5 shows the effect of the increase in fractional concentration (wt %) of a polyetherimide in a homopolycarbonate on smoke density (Ds-4), indicating an interaction behavior.

As shown in Table 9 and graphically illustrated in FIG. 5, the decrease in smoke density (Ds-4) as a function of PEI concentration is non-linear and larger than expected based upon simple rules of mixture (k=4.4 calculated according to the Equation in FIG. 5).

The addition of PEI to polycarbonate homopolymer (PC) reduces the smoke density (Ds-4) (Ds-4 of 493 as determined according to ISO5659-2 on a 3 mm thick plaque at 30% PEI), but not to below 300. The addition of PEI to PC homopolymer reduces the smoke density (Ds-4) to such aa degree that formulations containing PEI have smoke density (Ds-4) values (Ds-4 of 493 at 30% PEI as determined according to ISO5659-2 on a 3 mm thick plaque, Ex29) below 600, making them suitable for EN-45545 type applications (for R6 applications qualifying for HL1 compliance, a Ds-4 smoke density at or below 600 is required), provided that the other required properties (e.g. heat release) meet the requirements as well, whereas formulations without PEI do not meet these requirements (see CEx27, having Ds-4 of 1320 as determined according to ISO5659-2 on a 3 mm thick plaque, which would fail to meet even HL-1, requiring Ds-4≤600 for R6 applications).

Examples 31-35

To determine whether the interaction-indicating, non-linear effect on smoke density (Ds-4) holds for combinations of polycarbonate homopolymer and polycarbonate copolymer, PEI at different concentrations was added to a combination of polycarbonate homopolymer (BPA-PC) and PC-siloxane. Results and formulations are shown in Table 10.

TABLE 10

|  | CEx31 | Ex32 | Ex33 | Ex34 | CEx35 |
|---|---|---|---|---|---|
| Component |  |  |  |  |  |
| BPA-PC | 49.94 | 44.94 | 39.94 | 34.94 | 0 |
| PC-Si | 49.94 | 44.94 | 39.94 | 34.94 | 0 |
| IRGANOX 1076 | 0.04 | 0.04 | 0.04 | 0.04 | 0 |
| IRGAPHOS 168 | 0.08 | 0.08 | 0.08 | 0.08 | 0 |
| PEI | 0 | 10 | 20 | 30 | 100 |
| Property |  |  |  |  |  |
| Smoke density, DS-4 | 720 | 415 | 246 | 147 | 72 |

Figure 6:
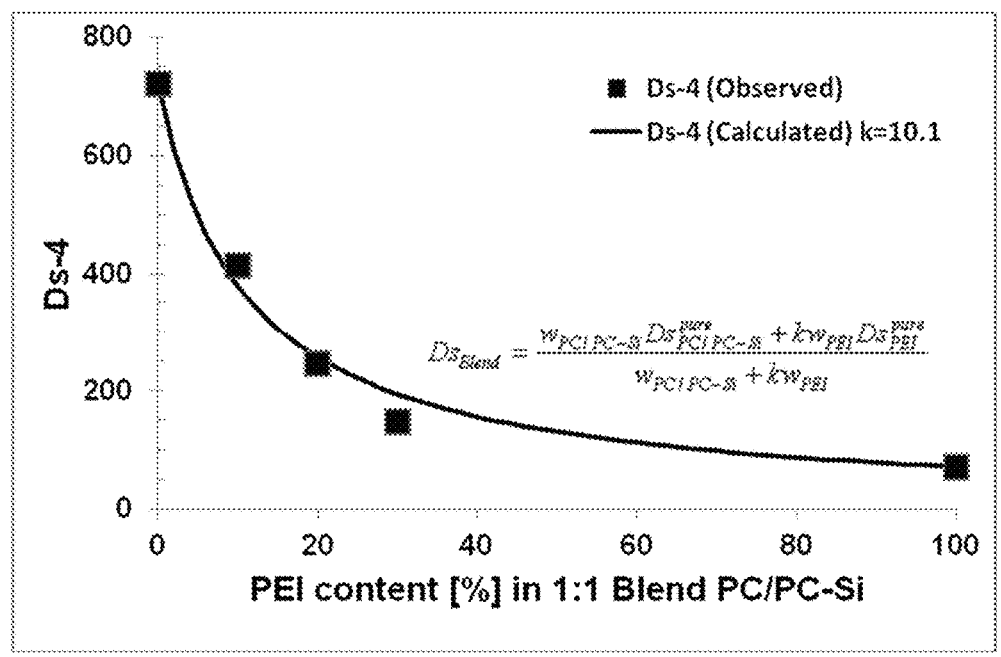
FIG. 6 the effect of the increase in fractional concentration (wt %) of a polyetherimide in a combination of a PC-siloxane copolymer and a homopolycarbonate on smoke density (Ds-4), indicating an interaction behavior.

As shown in Table 10 and illustrated graphically in FIG. 6, the decrease in smoke density (Ds-4) as a function of PEI concentration is non-linear and much larger than expected based upon simple rules of mixture (k=10.1 calculated according to the Equation in FIG. 6).

The addition of PEI to combinations of a polycarbonate homopolymer and a PC-siloxane can reduce the smoke density (Ds-4) to such an extent that formulations containing PEI have smoke density (Ds-4) values below 300 (Ds-4 of 246 (Ex33) and 147 (Ex34) at 20 and 30% PEI respectively, as determined according to ISO5659-2 on a 3 mm thick plaque), which would make them suitable for EN-45545 type applications (for R6 applications qualifying for HL2 compliance, a smoke density (Ds-4) at or below 300 is required), provided that the other required properties (e.g. heat release) meet the requirements as well, whereas the combination of polycarbonate homopolymer and a PC-siloxane without PEI does not meet these requirements (Ds-4 value of about 720 (CEx31) as determined according to ISO5659-2 on a 3 mm thick plaque, which would fail to meet even HL-1, requiring Ds-4≤600 for R6 applications).).

Examples 36-38

Examples 36-38 show that the addition of an aromatic organophosphorus compound (BPADP) to compositions of PEI in a polycarbonate copolymer results in a further unexpected combination of properties. Results and formulations are shown in Table 11.

TABLE 11

|  | CEx36 | Ex37 | CEX38 |
|---|---|---|---|
| Component |  |  |  |
| ITR-PC-siloxane | 43.92 | 40.17 | 49.97 |
| ITR-PC | 43.92 | 40.17 | 49.97 |
| PEPQ | 0.06 | 0.06 | 0.06 |
| Coated $TiO_2$ | 2.00 | 2.00 | 2.0 |
| Carbon black | 0.10 | 0.10 | 0.10 |
| BPADP | 0 | 7.5 | 0 |
| PEI | 10 | 10 | 0 |
| Properties |  |  |  |
| DS-4 | 111 | 117 | 158 |
| MAHRE | 83 | 43 | 96 |

The results show that the combination of a phosphorus-containing compound (BPADP) and PEI provides a significant decrease in the MAHRE properties compared to the composition without BPADP (with PEI in the formulation), lowering from a MAHRE of 83 (CEx36) to 43 (Ex37), as determined according to ISO5660-1 on a 3 mm thick plaque. The addition of the phosphorus containing compound does not adversely affect smoke density (Ds-4), with similar values with BPADP (Ds-4 of 111, CEx36) and without BPADP (Ds-4 of 117, Ex37), all determined according to ISO5659-2 on a 3 mm thick plaque.

The low heat release (MAHRE) and smoke density (Ds-4) make the components capable of meeting the requirements of the most strict hazard level (HL3) for R6 applications in European Railway standard EN-45545, which requires MAHRE of equal to or less than 60, as determined according to ISO5660-1 on a 3 mm thick plaque, and Ds-4 equal to or less than 150, as determined according to ISO5659-2 on a 3 mm thick plaque.

Table 12 summarizes the interaction parameter values obtained for the compositions showing the nonlinear effect of PEI addition on smoke density of various polycarbonate copolymers and their combinations.

TABLE 12

| Composition | Interaction Parameter (k) |
|---|---|
| ITR-PC | 52.7 |
| ITR-PC/ITR-PC-Si | 16.4 |
| PPPBP-PC | 5.2 |
| PC-Siloxane | 16.6 |

TABLE 12-continued

| Composition | Interaction Parameter (k) |
|---|---|
| PC | 4.4 |
| PC/PC-Siloxane | 10.1 |

As shown in Table 12, where a nonlinear effect is observed, the interaction parameter has a value of greater than 4. Using the k interaction parameters, it is possible to calculate the fractional concentration of PEI necessary to bring a given thermoplastic composition to meet the various Hazard Levels under EN 45545 European Rail standard (2013) requirements.

The singular forms "a," "an," and "the" include plural referents unless the context clearly dictates otherwise. "Or" means "and/or." The endpoints of all ranges directed to the same component or property are inclusive and independently combinable. The suffix "(s)" as used herein is intended to include both the singular and the plural of the term that it modifies, thereby including at least one of that term (e.g., "colorant(s)" includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(═O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; C1-6 or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising, based on the total weight of the thermoplastic composition,
70 to 95 wt % of a polycarbonate copolymer comprising first repeating units and second repeating units, wherein the first repeating units are not the same as the second repeating units, and wherein
the first repeating units are bisphenol carbonate units of the formula

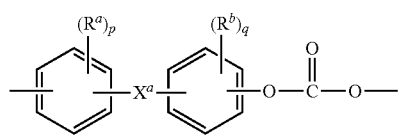

wherein
$R^a$ and $R^b$ are each independently $C_{1-12}$ alkyl, $C_{1-12}$ alkenyl, $C_{3-8}$ cycloalkyl, or $C_{1-12}$ alkoxy,
p and q are each independently 0 to 4, and
$X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and the second repeating units comprise a combination of monoaryl arylate ester units of the formula

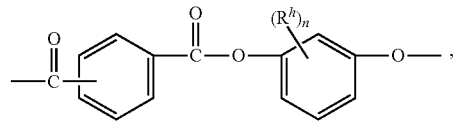

siloxane units of the formula

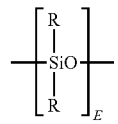

optionally, arylate-bisphenol ester units of the formula

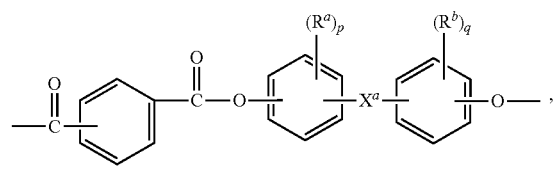

and
optionally monoaryl carbonate units of the formula

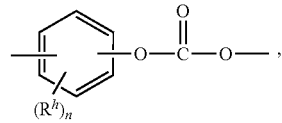

wherein in the foregoing formulas
$R^h$ is each independently a halogen atom or a $C_{1-10}$ hydrocarbon group,
n is 0 to 4,
$R^a$ and $R^b$ are each independently a $C_{1-12}$ alkyl,
p and q are each independently integers of 0 to 4, and
$X^a$ is a single bond, —O—, —S—, —S(O)—, —S(O)$_2$-, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group,
R is each independently a $C_{1-13}$ monovalent hydrocarbon group, and
E has an average value of 2 to 500; and
20 wt % to 30 wt % of a polyetherimide based on the weight of the composition, wherein an article molded from the composition has smoke density after 4 minutes (Ds-4) of less than or equal to 300 as measured by ISO 5659-2 on a 3 mm thick plaque.

2. The thermoplastic composition of claim 1, wherein an article molded from the composition has a multiaxial impact energy determined according to ISO 6603 on a 3.2 mm thick disc within 20% of the same composition without the polyetherimide.

3. The composition of claim 1, wherein in the polycarbonate copolymer, the first repeating units are bisphenol-A carbonate units.

4. The composition of claim 1, wherein the siloxane units are of the formula

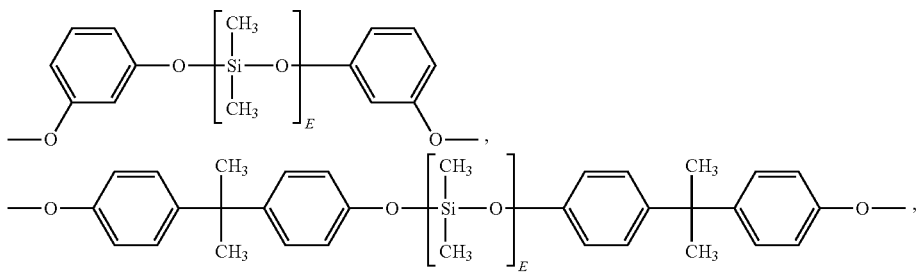

or a combination comprising at least one of the foregoing, wherein E has an average value of 2 to 200.

5. The composition of claim 1, wherein the siloxane units are of the formula

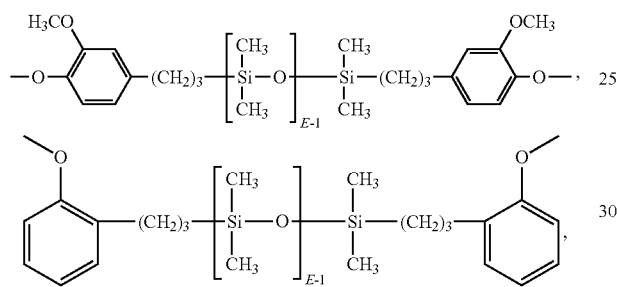

or a combination comprising at least one of the foregoing, wherein E has an average value of 2 to 200.

6. The composition of claim 1, wherein the polycarbonate copolymer comprises 1 to 20 mol % of bisphenol-A carbonate units,
60 to 90 mol % of isophthalic acid-terephthalic acid-resorcinol units, and
in an amount effective to provide 0.1 to 10 wt % of siloxane units based on the weight of polycarbonate, units of the formula

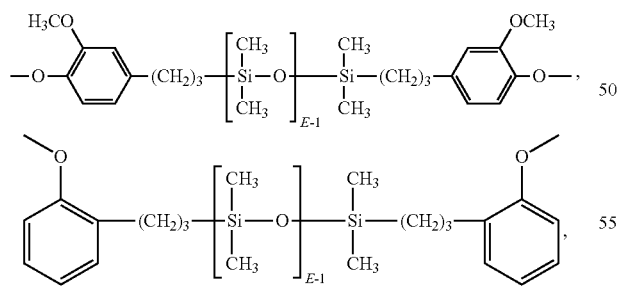

or a combination comprising at least one of the foregoing, wherein E has an average value of 2 to 80.

7. The composition of claim 3, further comprising a second polycarbonate copolymer comprising first repeating units and second repeating units different from the first repeating units, wherein the first repeating units are bisphenol carbonate units of the formula

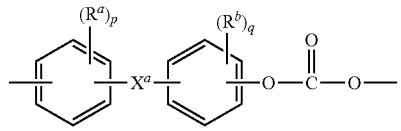

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)_2—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and the second repeating units comprise monoaryl arylate ester units of the formula

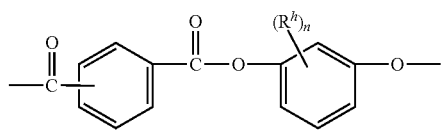

wherein $R^h$ is each independently a $C_{1-4}$ alkyl and n is 0 to 1.

8. The composition of claim 7, comprising, based on the weight of the polymers in the composition, 20 to 80 wt % of the polycarbonate copolymer, which comprises, based on the copolymer, 1 to 20 mol % of bisphenol-A carbonate units,
60 to 90 mol % of isophthalic acid-terephthalic acid-resorcinol units, and
in an amount effective to provide 0.1 to 10 wt % of siloxane units based on the weight of polycarbonate, units of the formula

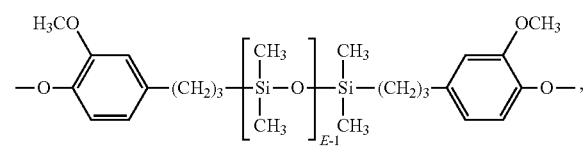

-continued

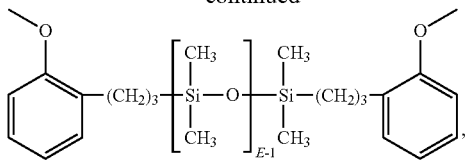

or a combination comprising at least one of the foregoing, wherein E has an average value of 2 to 30; and 20 to 80 wt % of a second polycarbonate copolymer, which comprises, based on the second polycarbonate copolymer, 2 to 20 mol % of bisphenol-A carbonate units, 60 to 98 mol % of isophthalic acid-terephthalic acid-resorcinol ester units, and optionally, 1 to 20 mol % resorcinol carbonate units, isophthalic acid-terephthalic acid-bisphenol-A ester units, or a combination thereof; and wherein an article molded from the composition has a smoke density (Ds-4) value of less than 150 as determined in accordance with ISO 5659-2 on 3 mm thick plaque.

9. The composition of claim 1, wherein the polyetherimide comprises units of the formula

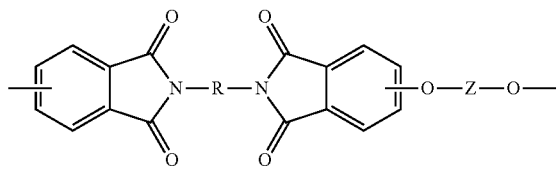

wherein

R is a $C_{2-20}$ hydrocarbon group, and

Z is an aromatic $C_{6-24}$ monocyclic or polycyclic group optionally substituted with 1 to 6 $C_{1-8}$ alkyl groups, 1 to 8 halogen atoms, or a combination thereof, wherein the divalent bonds of the —O—Z—O— group are in the 3,3', 3,4', 4,3', or the 4,4' positions.

10. The composition of claim 9, wherein R is a divalent radical of the formula

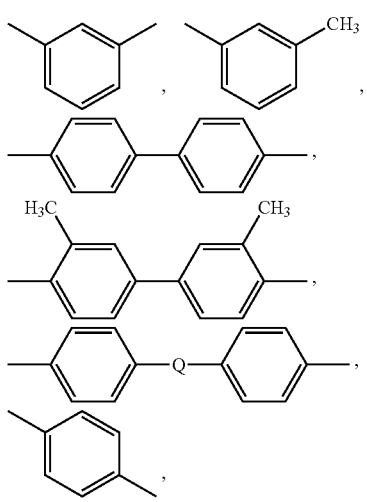

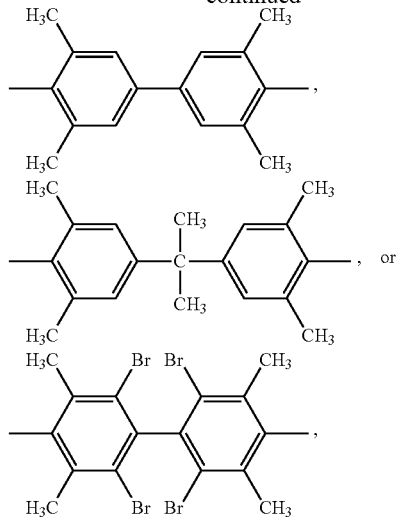

wherein Q is —O—, —S—, —C(O)—, —SO$_2$-, —SO—, or —C$_y$H$_{2y}$— or a halogenated derivative thereof wherein y is an integer from 1 to 5, and Z is a divalent group of the formula

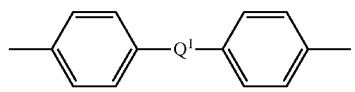

wherein $Q^1$ is —O—, —S—, —C(O)—, —SO$_2$-, —SO—, or —C$_y$H$_{2y}$— wherein y is an integer from 1 to 5.

11. The composition of claim 10, wherein R is m-phenylene and $Q^1$ is isopropylidene.

12. The composition of claim 1, further comprising an organophosphorus compound in an amount effective to provide 0.1-1 wt % phosphorus, based on the total weight of the composition.

13. The composition of claim 12, wherein the organophosphorus compound is of the formula

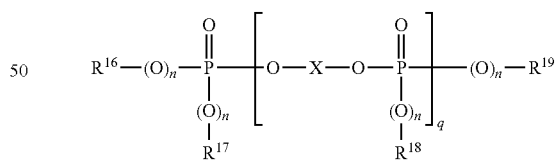

wherein $R^{16}$, $R^{17}$, $R^{18}$ and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is aromatic, n is each independently 0 or 1, and q is from 0.5 to 30.

14. The composition of claim 13, wherein each of $R^{16}$, $R^{17}$, $R^{18}$, and $R^{19}$ is phenyl, X is of the formula

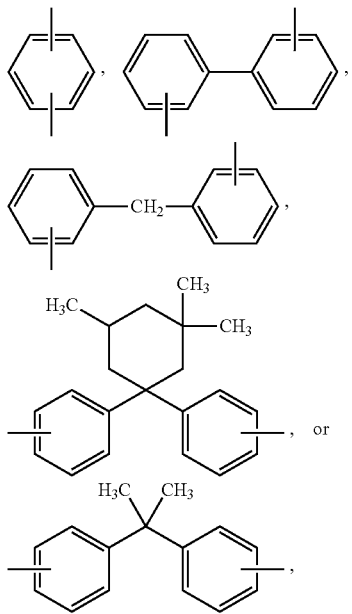

each n is 1, and
p is 1-5.

15. The composition of claim 12, wherein the organophosphorus compound is bisphenol-A bis(diphenyl phosphate), triphenyl phosphate, resorcinol bis(diphenyl phosphate), tricresyl phosphate, or a combination comprising at least one of the foregoing.

16. The composition of claim 1, wherein an increase in fractional concentration of polyetherimide in the composition reduces the smoke density (Ds-4) as measured in accordance with ISO 5659-2 on a 3 mm thick plaque in a non-linear manner, wherein an interaction parameter 'k' measured using the equation $$Ds_{Blend} = \frac{w_{POL}Ds_{POL}^{pure} + kw_{PEI}Ds_{PEI}^{pure}}{w_{POL} + kw_{PEI}}$$

where $DS_{Blend}$ is the smoke density of the composition;
$w_{POL}$ is the fractional wt % of the non-polyetherimide polymer(s)/copolymer(s) or their blends based on the weight of the composition;
$w_{PEI}$ is the fractional wt % of the polyetherimide based on the weight of the composition;
$Ds_{POL}^{pure}$ is the smoke density of the composition with only the non-polyetherimide polymer(s)/copolymer(s);
$Ds_{PEI}^{pure}$ is the smoke density of the composition with only polyetherimide; and
k is greater than 4.0.

17. An article selected from a molded article, a thermoformed article, an extruded film, an extruded sheet, a foamed article, one or more layers of a multi-layer article, a substrate for a coated article, and a substrate for a metallized article comprising the composition of claim 1.

18. The article of claim 17, wherein the article is a transportation component.

19. The article of claim 18, selected from a train or aircraft interior component, wherein the component is a partition, a room divider, a seat back, a food tray, a trim panel, an interior display panel, an interior wall, a side wall, an end wall, a ceiling panel, a door lining, a flap, a box, a hood, a louver, an insulation material, a handle, a body shell for a window, a window frame, an enclosure for an electronic device, a door, a luggage rack, a luggage container, an interior side of a gangway membrane, an interior lining of a gangway, or a component of a luggage compartment, a display unit, a television, a refrigerator door, a tray table, a food cart, a magazine rack, an air flow regulator, a door, a table, or a seat.

20. A method of manufacture of an article, comprising molding, extruding, or casting the thermoplastic composition of claim 1 to form the article.

21. The thermoplastic composition of claim 1, further comprising a bisphenol A homopolycarbonate.

22. The thermoplastic composition of claim 8, further comprising a bisphenol A homopolycarbonate.

* * * * *